(12) United States Patent
Dietle et al.

(10) Patent No.: US 6,227,547 B1
(45) Date of Patent: May 8, 2001

(54) HIGH PRESSURE ROTARY SHAFT SEALING MECHANISM

(75) Inventors: Lannie Dietle, Sugar Land; Jeffrey D. Gobeli, Houston, both of TX (US)

(73) Assignee: Kalsi Engineering, Inc., Sugar Land, TX (US)

(*) Notice: Subject to any disclaimer, the term of this patent is extended or adjusted under 35 U.S.C. 154(b) by 0 days.

(21) Appl. No.: 09/320,222

(22) Filed: May 26, 1999

Related U.S. Application Data

(60) Provisional application No. 60/088,234, filed on Jun. 5, 1998.

(51) Int. Cl.[7] ................................................. E21B 33/126
(52) U.S. Cl. ........................ 277/336; 277/422; 277/401
(58) Field of Search ..................... 277/411, 422, 277/413, 412, 401, 336

(56) References Cited

U.S. PATENT DOCUMENTS

| | | |
|---|---|---|
| 4,484,753 | 11/1984 | Kalsi . |
| 4,610,319 | 9/1986 | Kalsi . |
| 5,195,754 | 3/1993 | Dietle . |
| 5,199,514 * | 4/1993 | Titus ..................................... 277/336 |
| 5,230,520 | 7/1993 | Dietle et al. . |
| 5,527,045 * | 6/1996 | Pondelick et al. ............... 277/422 X |
| 5,678,829 | 10/1997 | Kalsi et al. . |
| 5,738,358 | 4/1998 | Kalsi et al. . |
| 5,823,541 | 10/1998 | Dietle et al. . |
| 5,873,576 | 2/1999 | Dietle et al. . |
| 6,016,880 | 1/2000 | Hall et al. . |

FOREIGN PATENT DOCUMENTS

WO 95/03504   2/1995   (WO) .

OTHER PUBLICATIONS

M.S. Kalsi, W.T. Conroy, L.L. Dietle, and J.D. Gobeli, "Development of Composite Coiled Tubing For Oilfield Services", Mar. 1997, Society of Petroleum Engineers Drilling Conference, Amsterdam, the Netherlands; SPE/IADS 37627 pp 469–477.

* cited by examiner

Primary Examiner—Lynne H. Browne
Assistant Examiner—John R. Cottingham
(74) Attorney, Agent, or Firm—Mayor, Day, Caldwell & Keeton; James L. Jackson, Esq.

(57) ABSTRACT

A laterally translatable pressure staged rotary shaft sealing mechanism having a seal housing with a shaft passage therein being exposed to a fluid pressure P1 and with a rotary shaft being located within the shaft passage. At least one annular laterally translatable seal carrier is provided. First and second annular resilient sealing elements are supported in axially spaced relation by the annular seal carriers and have sealing relation with the rotary shaft. The seal housing and at least one seal carrier define a first pressure staging chamber exposed to the first annular resilient sealing element and a second pressure staging chamber located between and exposed to the first and second annular resilient sealing elements. A first fluid is circulated to the first pressure chamber at a pressure P1, and a second staging pressure fluid is circulated to the second pressure chamber at a fraction of pressure P1 to achieve pressure staging, cooling of the seals. Seal placement provides hydraulic force balancing of the annular seal carriers.

31 Claims, 13 Drawing Sheets

HIGH PRESSURE ROTARY SHAFT SEALING MECHANISM

The benefit of United States Provisional Application Serial No. 60/088,234 of Jeffrey D. Gobeli, Lannie L. Dietle, Manmohan S. Kalsi and William T. Conroy, filed on Jun. 5, 1998 and entitled "High Pressure Rotary Shaft Sealing mechanism" is hereby claimed for all purposes and is incorporated by reference herein.

BACKGROUND OF THE INVENTION

1. Field of the Invention

The present invention relates generally to laterally translatable seal carrier mechanisms having rotary shaft seals. More particularly, the present invention is directed to an axially hydraulic force balanced laterally translatable seal carrier mechanism having a pressure staging system which divides a fluid pressure across two or more rotary shaft seals and also provides for active seal cooling and bearing cooling. In several embodiments, the axially hydraulic force balanced laterally translatable seal carrier system is substantially immune to pressure breathing. The invention also provides for enhanced rotary seal extrusion resistance, high operating pressure capability, and compatibility with rotary seal hydrodynamic lubrication.

2. Description of the Prior Art

A particularly difficult sealing situation occurs when a housing containing high pressure fluid is penetrated by a relatively rotatable shaft of large diameter. The difficulty is compounded when available axial space for the shaft sealing mechanism is limited. The energy industry, in particular, is currently in need of a compact high pressure rotary shaft sealing mechanism for sealing pressures in the range of 3,000–10,000 psi on shafts of approximately 8–24 inches in diameter which are subjected to severe mechanical loads and large resulting deflections.

Resilient rotary seals require a very small shaft to housing clearance and minimum runout for optimum high pressure extrusion resistance. If the shaft to housing clearance is too large, the pressure causes the seal to bulge or protrude into the shaft to housing clearance and suffer classic extrusion damage leading to early failure. The protrusion is a direct function of the pressure, the seal modulus of elasticity, and the size of the shaft to housing clearance. The larger the clearance, the more the protrusion. The inevitable dynamic runout of a large diameter shaft, in conjunction with "pressure breathing" of a large housing, efficiently destroys seal material which protrudes into the shaft to housing clearance. Cyclic strain causes the protruding material to break away from the seal, only to be replaced by more protruding material until the seal ultimately fails.

In practice, the shaft to housing clearance must be as small as possible to avoid seal extrusion damage, but it must also be sufficiently large to avoid shaft to housing contact. If shaft to housing contact occurs, the housing assumes part of the side load intended for other bearing locations, and the resulting friction and heat can damage the shaft and housing and destroy the rotary seal. Unfortunately, if the shaft to housing clearance for a large shaft is in a useful range for resilient rotary seals, it is virtually impossible to guide the shaft so precisely that it will not rub on the housing bore. It is therefore desirable to provide a laterally translatable rotary shaft sealing mechanism which provides efficient sealing at high operating pressures while minimizing the potential for seal extrusion and heat induced seal failure.

A number of factors prohibit a small shaft to housing clearance and precise shaft guidance in large machinery. Manufacturing tolerances are large, which directly affects the size of shaft to housing clearance, and also increases bearing mounting clearance and bearing internal clearance, which permits shaft runout and misalignment. Large components are often subject to significant elastic deformation when exposed to high pressure and large mechanical loads, and are often subject to significant dimensional variability from differential thermal expansion and contraction caused by seal and bearing heat. Such dimensional variability can have a dramatic effect on assembly clearances and bearing internal clearances, which can permit large dynamic runout and lateral offset of the shaft, and which can also cause large variations in shaft to housing clearance. It is desirable therefore to provide an efficient laterally translatable rotary shaft sealing mechanism which may be utilized effectively for large shaft diameters as well as high pressure conditions and is capable of accommodating conditions of enhanced dynamic runout and housing pressure breathing while effectively minimizing pressure responsive seal extrusion and thereby providing for extensive service life of the rotary shaft seals thereof.

SUMMARY OF THE INVENTION

It is a principal feature of the present invention to provide a laterally translatable rotary shaft sealing mechanism having efficient sealing capability at high operating pressures while minimizing the potential for seal extrusion and heat induced seal failure.

It is another feature of the present invention to provide a laterally translatable rotary shaft sealing mechanism having the capability for accommodating wide assembly clearances and bearing internal clearances in condition of large diameter rotary shaft sealing, which can permit large dynamic runout and lateral offset of the shaft, and which can also cause large variations in shaft to housing clearance.

It is an even further feature of the present invention to provide a laterally translatable rotary shaft sealing mechanism that is capable of accommodating conditions of enhanced dynamic runout and housing pressure breathing while effectively minimizing pressure responsive seal extrusion and thereby providing for extensive service life of the rotary shaft seals thereof.

Briefly, the present invention is a laterally translatable pressure staged rotary shaft sealing mechanism which is an improvement over the hydraulic force balanced, laterally translating rotary seal carrier assembly of commonly assigned U.S. Pat. No. 5,195,754. The invention provides laterally translatable seal annular carrier means which are laterally translatable relative to a housing having a shaft passage exposed to a pressure therein, and provides staging pressure means which divides a fluid pressure across two or more annular resilient rotary sealing elements by introducing a staging pressure into staging pressure chamber(s) located between the two or more annular resilient rotary sealing elements, and also incorporates a fluid circulation system to provide active seal cooling means and bearing cooling means. A force balancing system substantially balances the hydraulic forces acting axially on the laterally translatable seal annular carrier means, thereby assuring freedom of lateral translation. In several embodiments, the force balancing system establishes substantial balancing of radially acting hydraulic forces such that the axially hydraulic force balanced laterally translatable seal carrier means are made substantially immune to pressure breathing. The invention provides enhanced rotary seal extrusion resistance, higher pressure capability, and better compatibility with rotary seal hydrodynamic lubrication, compared to prior art.

The laterally translatable seal carrier means can take the form of a single annular seal carrier, or a plurality of two or more individual annular seal carriers; and each annular seal carrier may be formed in one piece, or may be formed from an assembly of two or more components, and may be deployed within pressure partitioning bulkhead means.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof It is to be noted however, that the appended drawings illustrate only a typical embodiment of this invention and are therefore not to be considered limiting of its scope, for the invention may admit to other equally effective embodiments.

In the Drawings.

DETAILED DESCRIPTION OF PREFERRED EMBODIMENT

Figure 1:
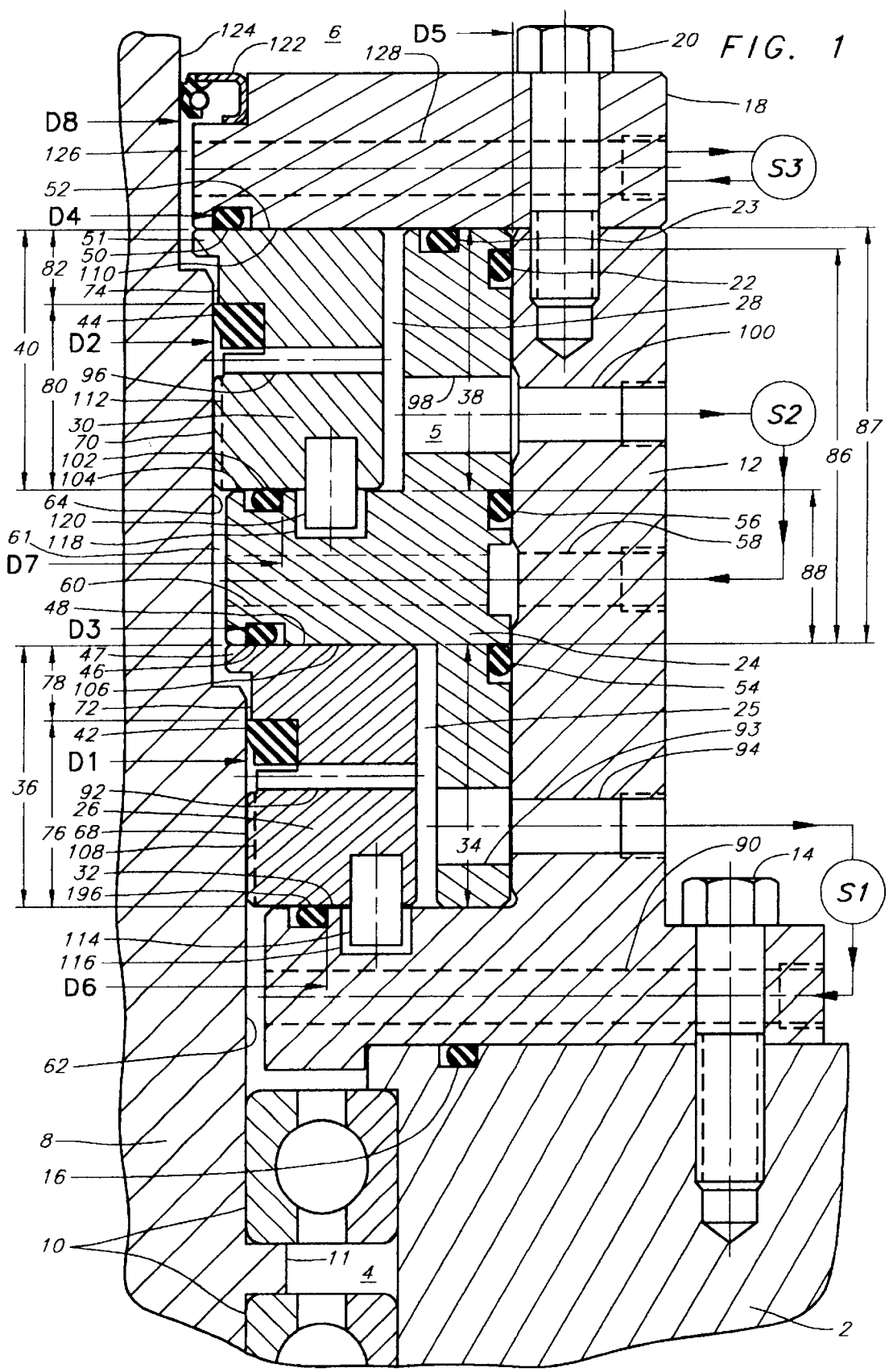
FIG. 1 is a sectional view taken in quarter section and showing an axially hydraulic force balanced laterally translatable seal carrier mechanism embodying the principles of the present invention and providing a pressure staging system which divides a fluid pressure across two or more annular resilient rotary sealing elements, and also provides active seal cooling and bearing cooling.

Referring now to the Drawings and first to FIG. 1, the invention is a shaft sealing mechanism which provides axially hydraulic force balanced laterally translatable seal carrier means, and provides staging means which divides a fluid pressure across two or more rotary seals, and also provides active seal cooling means and bearing cooling means, and provides enhanced rotary seal extrusion resistance, higher pressure capability, and efficient compatibility with rotary seal hydrodynamic lubrication.

The Embodiment of FIG. 1

The invention, represented in fragmentary longitudinal cross-section in FIG. 1 herein is a laterally translatable pressure staged rotary shaft sealing mechanism directed at fluid retention in applications where a relatively rotatable shaft penetrates a housing or vessel containing a pressurized fluid therein. The invention is particularly suitable for use where the shaft may have dynamic runout and side-load induced shaft lateral offset, such as when large diameter shafts are employed.

In FIG. 1 a housing 2 of a machine partitions first fluid 4 which is pressurized at pressure P1 from an environment 6. First fluid 4 is preferably a lubricant. Housing 2 is penetrated by a shaft 8 which is relatively rotatable with respect to housing 2 and which may be guided for rotation within the housing 2 by one or more bearing 10. Shaft 8 may incorporate a shoulder 11 which transfers axial thrust from shaft 8 to housing 2 via said one or more bearing 10 if desired. In FIG. 1 and FIGS. 3–13, the shaft may comprise a single component, or may be comprised of several components assembled together, such as one or more sleeve components being assembled together with a generally rod-like or tube-like component, or several components threaded together to form a generally rod-like or tube-like component, it being understood that the shaft may also be hollow to conduct a fluid between relatively rotatable machine elements. Two of many possible configurations of multiple-part shafts are shown in FIGS. 8 and 13

Figure 2:
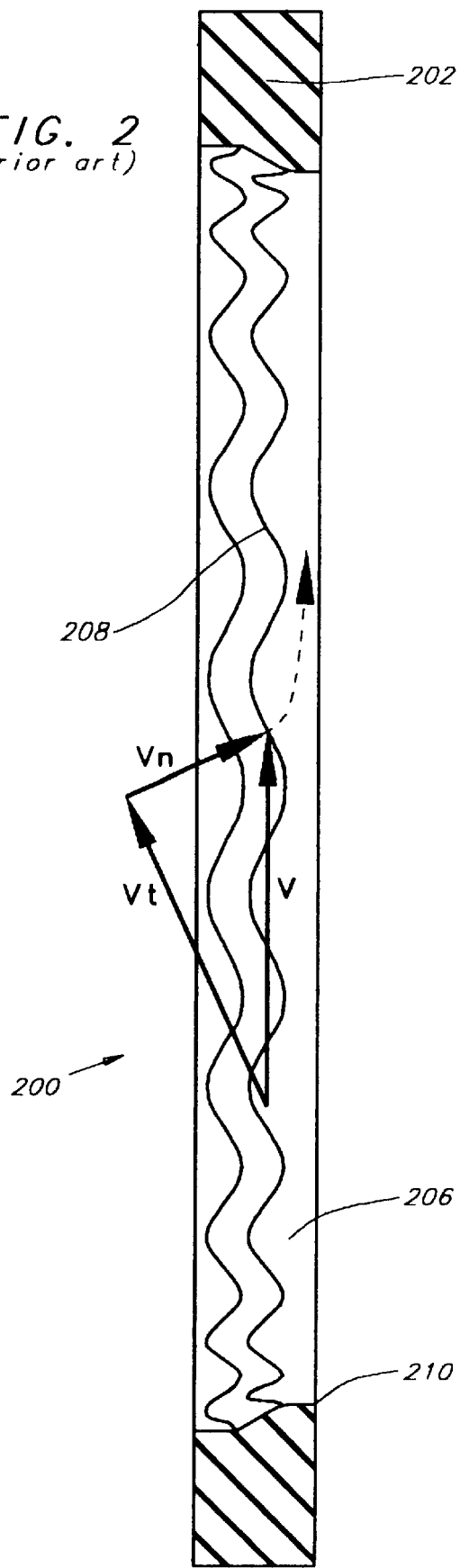
FIG. 2 is a sectional view showing a hydrodynamically lubricated circular sealing element, shown in the uncompressed condition thereof representing the prior art and incorporating a force vector illustration depicting the theory of hydrodynamic wedging of lubricant into the sealing interface with a relatively rotatable sealing surface, which may be incorporated as a circular rotary shaft seal within the axially hydraulic force balanced laterally translatable seal carrier of FIG. 1 and FIGS. 3–13.

A seal housing 12 is attached to housing 2 by retaining means 14, which can take any suitable form, such as a pattern of bolts, a threaded connection, a snap-ring-type retaining ring, etc. Alternately, seal housing 12 and housing 2 may be constructed together as an integral unit, as shown in FIG. 2. Seal 16 establishes a static sealed relationship between housing 2 and seal housing 12.

A retainer 18 is retained to seal housing 12 by retaining means 20, which can take any suitable form, such as a pattern of bolts, a threaded attachment of the seal housing to the machine housing 2, a snap-ring-type retaining ring, or any other suitable means for retaining connection. Seal 22 establishes a sealed relationship between bulkhead 24 and seal housing 12, and seal 23 establishes a static sealed relationship between bulkhead 24 and retainer 18. Bulkhead 24 defines a first seal carrier recess 25 of generally annular form within which is located first stage seal carrier 26 deposed in laterally translatable assembly relative to bulkhead 24, seal housing 12, and housing 2, and defines a second seal carrier recess 28 of generally annular form within which is located second stage seal carrier 30 deposed in laterally translatable assembly relative to bulkhead 24, seal housing 12, and housing 2.

Retainer 18 clamps bulkhead 24 against interior surface 32 of seal housing 12, and retains first stage seal carrier 26, bulkhead 24, and second stage seal carrier 30 within seal housing 12. Interior surface 32 is preferred to be substantially planar. Length 34 of first seal carrier recess 25 is greater than length 36 of first stage seal carrier 26, and length 38 of second seal carrier recess 28 is greater than length 40 of second stage seal carrier 30.

Seal 54 and seal 56 establish a static sealing relationship between bulkhead 24 and seal housing 12 to permit communication between passage 58 and passage 60. Rotary seal 42 and rotary seal 44 are annular resilient rotary sealing elements of any suitable form which are installed in grooves defined in their respective seal carriers. The grooves are sized to hold the seals in radial compression against shaft 8 which initiates an interference sealing relationship between the rotary seals and their respective grooves and the mating relatively rotatable surfaces of shaft 8. Rotary seal 42 establishes a rotatable sealed relationship between surface 62 of shaft 8 and first stage seal carrier 26 at effective sealing diameter D1. Rotary seal 44 establishes a rotatable sealed relationship between surface 64 of shaft 8 and second stage seal carrier 30 at effective sealing diameter D2.

Sliding seal 46 establishes a laterally slidable sealed relationship between bulkhead 24 and end surface 48 of first stage seal carrier 26 at effective sealing diameter D3, which is substantially the same as effective sealing diameter D1. End surface 48 may be substantially planar in form, as shown. Sliding seal 50 establishes a laterally slidable sealed relationship between retainer 18 and end surface 52 of second stage seal carrier 30 at effective sealing diameter D4, which is substantially the same as effective sealing diameter D2. End surface 52 may be substantially planar in form, as shown. The shaft step between effective sealing diameter D1 and effective sealing diameter D2 provides the necessary room for inwardly projecting balancing shoulder 47 of first stage seal carrier 26 which extends surface 48 inward of effective sealing diameter D3 to preserve the integrity of sliding seal 46 while accommodating lateral translation of first stage seal carrier 26. The shaft step between effective sealing diameter D2 and effective sealing diameter D8 provides the necessary room for inwardly projecting balancing shoulder 51 of second stage seal carrier 30 which extends surface 52 inward of effective sealing diameter D2 to preserve the integrity of sliding seal 50 while accommodating lateral translation of second stage seal carrier 30.

Any suitable material may be used in construction of the housing(s), retainer, seal carriers, and bulkhead(s) of the present invention depicted in FIGS. 1 and 3–13, including the various metals and plastics, however the preferred basic material of construction is steel due to its high modulus of elasticity, high strength, and high thermal conductivity.

All sliding surfaces including the shaft and journal bearing surfaces, and particularly including end surface 48 and end surface 52, may be treated with a low friction and/or hard surfacing treatment such as nickel or cobalt based sprayed and fused coatings and tungsten carbide coatings, or Teflon coating, or diamond coating, or boronizing, or hard chrome coating, or nitriding, or a colmonoy coating, or a stellite coating or other welded hardfacing, or other surface enhancement coatings or surface modification techniques, including ion beam deposition, to enhance the wear resistance and frictional properties thereof.

First fluid 4 is pressurized at pressure P1. A second fluid 5 is introduced between first stage seal carrier 26 and second stage seal carrier 30 and pressurized at pressure P2 via passage 58 and passage 60 into staging pressure chamber 61. Second fluid 5 is preferably a lubricant. Pressure P2 is maintained at a pressure which is a fraction of pressure P1, and which may be substantially equal to pressure P1/2. Because pressure P2 is a fraction of pressure P1, rotary seal 42, rotary seal 44, sliding seal 46 and sliding seal 50 are exposed to a differential pressure which is a only fraction of pressure P1. For the purposes of this specification, the term fluid has its broadest meaning, encompassing both liquids and gases.

Any suitable means may be used to maintain pressure P2 at a fraction of pressure P1. For example, the area ratio of a hydraulic cylinder could be used to maintain pressure P2 at a fraction of pressure P1. Alternately, a hydraulic accumulator could be used to maintain pressure P2 at a desired value. Alternately, a pump and orifice or other flow restriction could be used to establish pressure P2 as a fraction of pressure P1, and the same pumped fluid could produce pressure P1 on the upstream side of the orifice (or other restriction), and pressure P2 on the other side of the orifice (or other restriction). As another alternative, a pumping and valving system having computer-controlled pressure feedback and control means could be used to maintain pressure P2 at a fraction of pressure P1, where said pressure feedback means may be voltage from pressure transducers, and said control means may be a valve forming a variable flow restriction, or may be control of pump flow rate through an orifice, or may be control of a separate fluid (gas or liquid) pressure acting upon an accumulator or piston or bladder type transfer barrier, or may be by other suitable computer-controlled means.

Pressure P1 may be a variable pressure, as may be determined by pressure variations in a process fluid, and/or by the pressure needs of a hydraulic system. For example, pressure P1 might be a hydraulic pressure used to actuate one or more mechanisms of a machine, such as the sealing element of a diverter. Pressure P2 may also be a variable pressure. As an other example, pressure P1 could be made to track the pressure of a process fluid by any suitable means, such as by a bladder or piston type transfer barrier, or by computer monitoring of the process fluid pressure, and computer control of pressure P1.

Because effective sealing diameter D3 is substantially the same as effective sealing diameter D1, first stage seal carrier 26 is substantially hydraulic force balanced in the axial direction, and therefore substantially free of axially oriented hydraulic force, and free to translate laterally. Rotary seal 42 and sliding seal 46 define substantially equal pressure responsive areas such that opposed pressure induced hydraulic forces acting axially on first stage seal carrier 26 substantially cancel one another. Journal bearing bore 68 of first stage seal carrier 26 has a closely fitting journal bearing-type guiding relationship with surface 62 of shaft 8 which forces first stage seal carrier 26 to translate laterally in response to dynamic runout and lateral offset of shaft 8.

The extrusion gap for rotary seal 42 is defined by surface 62 and extrusion gap diameter 72, and the extrusion gap for rotary seal 44 is defined by surface 64 and extrusion gap diameter 74. Extrusion gap diameter 72 is preferably larger than journal bearing bore 68 so that any rubbing contact between first stage seal carrier 26 and surface 62 occurs at journal bearing bore 68 and not at extrusion gap diameter 72. This relationship insures that any frictional heat occurring from contact between first stage seal carrier 26 and surface 62 occurs at a region remote from the extrusion gap of rotary seal 42.

Likewise, because effective sealing diameter D4 is substantially the same as effective sealing diameter D2, second stage seal carrier 30 is substantially hydraulic force balanced in the axial direction, and therefore substantially free of axially oriented hydraulic force, and free to translate laterally. Journal bearing bore 70 of second stage seal carrier 30 has a closely fitting journal bearing-type relationship with surface 64 of shaft 8 which forces second stage seal carrier 30 to translate laterally in response to dynamic runout and lateral offset of shaft 8. Rotary seal 44 and sliding seal 50 define substantially equal pressure responsive areas such that opposed pressure induced hydraulic forces acting axially on second stage seal carrier 30 substantially cancel one another. Extrusion gap diameter 74 is preferably larger than journal bearing bore 70 so that any rubbing contact between second stage seal carrier 30 and surface 64 occurs at journal bearing bore 70 and not at extrusion gap diameter 74. This relationship insures that any frictional heat occurring from contact between second stage seal carrier 30 and surface 64 occurs at a region remote from the extrusion gap of rotary seal 44.

Sufficient radial clearance is provided between first stage seal carrier 26 and bulkhead 24 defined by first seal carrier recess 25 so that first stage seal carrier 26 has room to translate laterally in response to anticipated levels of shaft lateral motion; which may be quite large in large diameter high pressure equipment such as diverters. Likewise, sufficient radial clearance is provided between second stage seal carrier 30 and bulkhead 24 defined by second seal carrier recess 28 so that second stage seal carrier 30 has room to translate laterally in response to anticipated levels of shaft motion.

Because first stage seal carrier 26 and second stage seal carrier 30 translate laterally in response to dynamic runout and lateral offset of shaft 8, the extrusion gaps for rotary seal 42 and rotary seal 44 are relatively constant and unvarying in dimension, which enhances the extrusion resistance of rotary seal 42 and rotary seal 44.

The inside diameter of first stage seal carrier 26 is exposed to pressure P1 along length 76, and the outside diameter is exposed to pressure P1 along length 36, therefore first stage seal carrier 26 is completely pressure radially balanced along length 36 and only exposed to differential pressure along the relatively short length 78. Because first stage seal carrier 26 is only exposed to differential pressure along the relatively short length 78, first stage seal carrier 26 is substantially pressure balanced in the radial direction, and the journal bearing bore 68 and extrusion gap diameter 72 are substantially immune to differential pressure-induced dimensional changes, which makes the invention particularly suitable for large diameter apparatus. It is preferred that the ratio of length 76 divided by length 36 be greater than or equal to 0.7.

Likewise, the inside diameter of second stage seal carrier 30 is exposed to pressure P2 along length 80, and the outside diameter is exposed to pressure P2 along length 40, therefore second stage seal carrier 30 is radially pressure balanced along length 80 and only exposed to differential pressure along the relatively short length 82. Because second stage seal carrier 30 is only exposed to differential pressure along the relatively short length 82, second stage seal carrier 30 is substantially pressure balanced in the radial direction, and the journal bearing bore 70 and extrusion gap diameter 74 are substantially immune to differential pressure-induced dimensional changes, which makes the invention particularly suitable for large diameter apparatus. It is preferred that the ratio of length 80 divided by length 40 be greater than or equal to 0.7.

The inside and outside diameters of bulkhead 24 are exposed to pressure P1 along length 34. The outside of bulkhead 24 is exposed to pressure P2 along length 86, and the inside is exposed to pressure P2 along length 87, and therefore bulkhead 24 is substantially pressure balanced in the radial direction along most of its length and is therefore substantially immune to differential pressure-induced diameter changes. Partition length 88 of bulkhead 24 provides sufficient rigidity to withstand the hydraulic force resulting from pressure P1 acting over the area between effective sealing diameter D3 and effective sealing diameter D5 so that second stage seal carrier 30 does not become pinched between retainer 18 and interior surface 104 of bulkhead 24. Partition length 88 serves to partition first fluid 4 from second fluid 5.

For cooling of rotary seal 42, first fluid 4 can be circulated by first fluid source S1 in a preferred direction entering through passage 90, passing through the journal bearing clearance between journal bearing bore 68 and surface 62 of shaft 8, then through radial passages 92, then through radial passage 93, then exiting at passage 94. Alternatively, the circulation direction can be reversed, entering at passage 94 and exiting at passage 90. Sliding barrier seal 196 ensures that the circulation of first fluid 4 passes through the journal bearing clearance between journal bearing bore 68 and surface 62 of shaft 8 for maximum cooling efficiency, and through radial passages 92, rather than short-circuiting between first stage seal carrier 26 and interior surface 32 of seal housing 12.

For cooling of rotary seal 44 and rotary seal 42, second fluid 5 can be circulated by second fluid source S2 in a preferred direction entering through passage 58 and passage 60, passing through the journal bearing clearance between journal bearing bore 70 and surface 64 of shaft 8, then through radial passages 96, then through passage 98, exiting at passage 100. Alternatively, the circulation direction can be reversed, entering at passage 100 and exiting at passage 58. Sliding barrier seal 102 ensures that the circulation passes through the clearance between journal bearing bore 70 and surface 64 of shaft 8 for maximum cooling efficiency, and through radial passages 96, rather than short-circuiting between second stage seal carrier 30 and interior surface 104 of bulkhead 24. Interior surface 104 may be substantially planar, as shown. Radial passages 92 may take the form of a multiplicity of radial holes provided to distribute the circulation about the circumference of rotary seal 42, and radial passages 196 may take the form of a multiplicity of radial holes provided to distribute the circulation about the circumference of rotary seal 44 to enhance the cooling of the rotary seal.

Circulation of first fluid 4 and second fluid 5 draws heat away from shaft 8 which helps keep rotary seal 42 and rotary seal 44 cool for maximum extrusion resistance, and inhibits thermal expansion of shaft 8 which might otherwise cause interference with journal bearing bore 68 and journal bearing bore 70.

Figure 3:
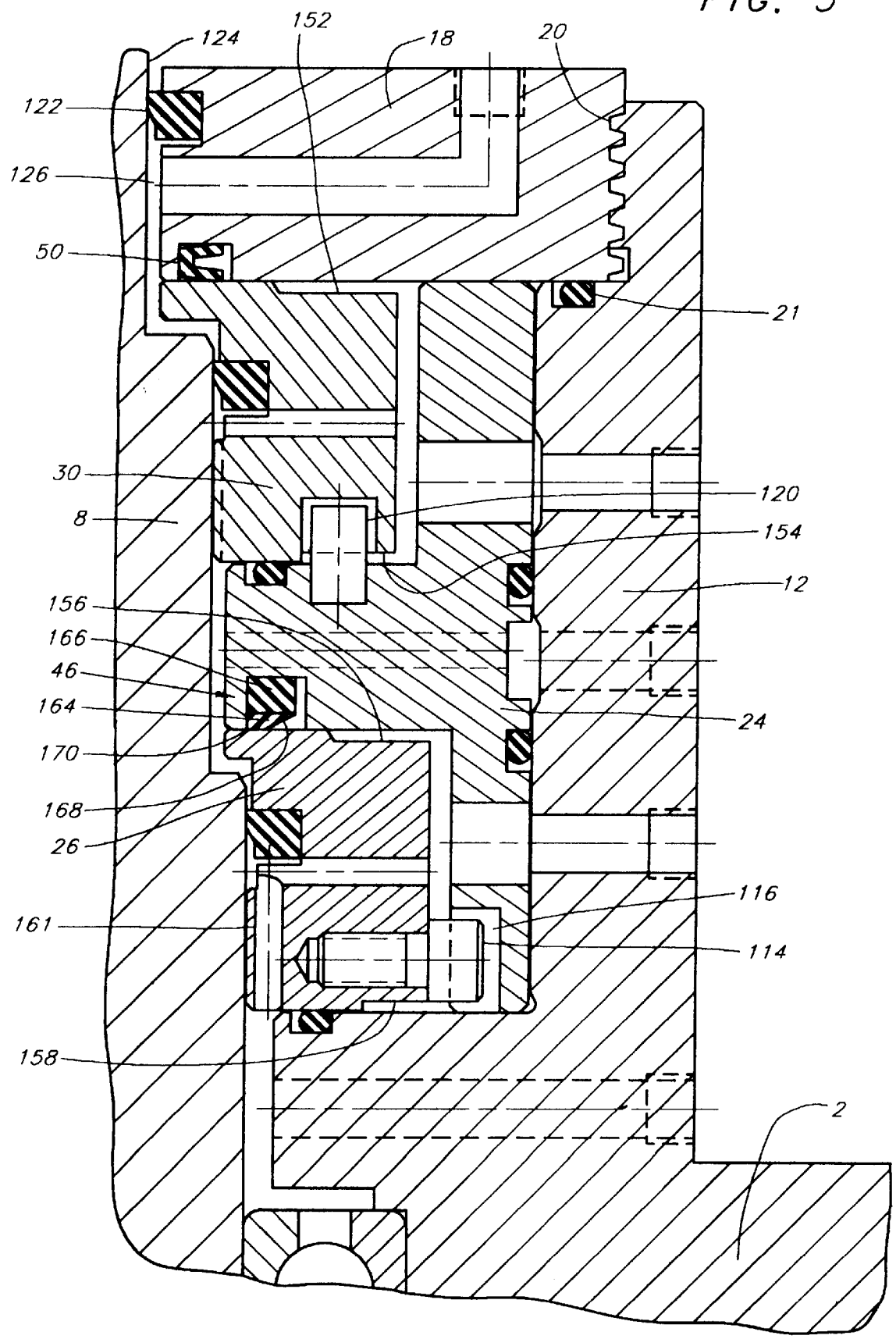
FIG. 3 quarter sectional view illustrating an alternative embodiment of the present inventions showing a seal housing being integral with a main housing and with axially hydraulic force balanced laterally translatable seal carrier means being incorporated therein according to the teachings of the present invention.

Circulation of first fluid 4 in the above described preferred direction through the journal bearing clearance between journal bearing bore 68 and surface 62 creates a pressure drop which acts over the area between effective sealing diameter D1 and effective sealing diameter D6 which can create a potential hydraulic force imbalance which acts on first stage seal carrier 26 to force it against interior surface 106 of bulkhead 24. This potential hydraulic force imbalance can be compensated for, minimized and controlled by sizing of diameter D3 to make it slightly smaller than diameter D1 to produce balance, or by providing one or more flow slots 108 through the journal bearing bore 68 to minimize the pressure drop. Said flow slots may be substantially longitudinally oriented, or they may be skewed. It can be appreciated that one or more longitudinal holes in the seal carrier would perform the same control of pressure drop as flow slots 108, as shown in FIG. 3. It can be useful, however, to purposely cause a slight hydraulic force imbalance which acts on first stage seal carrier 26 to force it against interior surface 106 of bulkhead 24 and thereby close the extrusion gap for sliding seal 46 to enhance the extrusion resistance thereof. If first fluid 4 is not circulated, the slight hydraulic force imbalance required to close the extrusion gap of sliding seal 46 can be created if desired by making effective sealing diameter D3 slightly larger than effective sealing diameter D1.

Likewise, circulation of second fluid 5 in the above described preferred direction through the journal bearing clearance between journal bearing bore 70 and surface 64 creates a pressure drop which acts over the area between effective sealing diameter D2 and effective sealing diameter D7 which can create a potential hydraulic force imbalance which acts on second stage seal carrier 30 to force it against interior surface 110 of retainer 18. This potential hydraulic force imbalance can be compensated for, minimized and controlled by providing flow slots 112 through the journal bearing bore 70 to minimize the pressure drop, or by sizing diameter D4 to correct the imbalance. It is useful, however, to purposely cause a slight hydraulic force imbalance which acts on second stage seal carrier 30 to force it against interior surface 110 of retainer 18 and thereby close the extrusion gap for sliding seal 50 to enhance the extrusion resistance thereof. If second fluid 5 is not circulated, the slight hydraulic force imbalance required to close the extrusion gap of sliding seal 50 can be created by making effective sealing diameter D4 slightly larger than effective sealing diameter D2. The pressure drop resulting from circulation of first fluid 4 and second fluid 5 in the preferred direction means that the rotary seals are exposed to less differential pressure; any resulting slight hydraulic imbalance is considered to still fall within the teachings of seal carriers being substantially hydraulically force balanced in the axial direction. It can be appreciated that first fluid 4 and second fluid 5 can also be circulated opposite the preferred direction if desired. It can also be appreciated that first fluid 4 may be circulated without circulation of second fluid 5, if desired, or visa-versa.

Rotary seal 42 and the journal bearing relationship between journal bearing bore 68 and surface 62 impart torque to first stage seal carrier 26 which is reacted to pocket 116 in seal housing 12 by anti-rotation member 114. Rotary seal 44 and the journal bearing relationship between journal bearing bore 70 and surface 64 impart torque to second stage seal carrier 30 which is reacted to reaction pocket 118 in bulkhead 24 by anti-rotation member 120. Bulkhead 24 is prevented from rotating by virtue of being clamped against interior surface 32 by retainer 18, or by other suitable means, such as a mechanical indexing member providing indexing and anti-rotational engagement between bulkhead 24 and housing 12 and/or retainer 18. Anti-rotation member 114 and anti-rotation member 120 can take any suitable form without departing from the spirit or scope of the invention; for example they could be screws instead of pins, or could be integral to the seal carriers rather than assembled to the seal carriers, and could both be radially oriented rather than axially oriented if desired, the reaction pockets can be incorporated into seal carriers 26 and 30, and the anti-rotation members can be incorporated into the bulkhead 24, the retainer 18, and the housing 12.

A low pressure outboard rotary seal 122, located outboard of the outermost annular resilient rotary seal 44 establishes a sealed relationship between retainer 18 and surface 124 of shaft 8 at effective sealing diameter D8, which defines a sealed annular low pressure coolant fluid circulation chamber 126 between rotary seal 44 and rotary seal 122. Rotary seal 122 may be of any suitable type or configuration, such as a lip seal, which is tolerant of dynamic runout and lateral shaft offset at low pressure. Rotary seal 122 may also, if desired, be located within a laterally translatable seal carrier which need not be axially force balanced.

For cooling of rotary seal 44 and rotary seal 122, a fluid coolant such as water or oil can be circulated by third fluid source S3 at low pressure within annular cavity 126 by pumping the coolant in at coolant passage 128 and letting it exit at a similar passage (not shown) which is located remote from passage 128.

First fluid source S1, second fluid source S2 and third fluid source S3 may take any suitable form without departing from the spirit or scope of the present invention. Pressure P2 may be established at a fraction of Pressure P1 by any suitable means without departing from the spirit or scope of the present invention.

In the preferred embodiment represented by FIG. 1, first fluid 4, second fluid 5 and the fluid coolant circulated in annular cavity 126 may each, for the purpose of extracting heat therefrom, be circulated through respective heat exchangers, which can take any suitable form without departing from the spirit or scope of the present invention. For example, shell and tube type heat exchangers, finned tube heat exchangers, evaporative cooling systems, refrigeration-type chillers, etc. may conveniently be used.

Rotary seal 42 and rotary seal 44, and the rotary seals of FIGS. 3–13, may conveniently take the form of hydrodynamic seals such as those marketed by Kalsi Engineering, Inc. under U.S. Pat. Nos. 5,873,576, 5,738,358, 5,678,829, 5,230,520 and 4,610,319, or they may take the form of any one of a number of other rotary shaft seals which are suitable for the purposes intended, such as O-Rings, square rings, chevron seals, spring energized polymeric seals, O-Ring energized polymeric seals, or conventional packing.

In the preferred embodiment, rotary seal 42 and rotary seal 44 provide a hydrodynamic pumping action per the teachings of U.S. Pat. No. 4,610,319 which lubricates the dynamic sealing surfaces of the seals, and the mating surfaces of shaft 8. Such a hydrodynamic seal is shown in the cross-sectional illustration of FIG. 2 generally at 200. The hydrodynamic seal 200 consists of a resilient generally circular body 202 which defines an peripheral dynamic sealing surface 206 which has a circular edge 210 and a non-circular hydrodynamic edge 208 which, in response to relative rotation, hydrodynamically lubricates dynamic sealing surface 206 and the mating surface of the relatively rotatable shaft by wedging a minute lubricant film into the dynamic sealing interface between dynamic sealing surface 206 and the shaft. The lubricant is wedged into the dynamic sealing interface by the normal component Vn of the rotational velocity V acting on non-circular hydrodynamic edge 208 of peripheral dynamic sealing surface 206. The lubricant film prevents the typical dry rubbing wear and heat generation associated with conventional non-hydrodynamic seals. Because the hydrodynamic seal 200 generates less heat than conventional non-hydrodynamic seals, the seal material retains a higher modulus of elasticity during operation, and can therefore provide better high pressure extrusion resistance compared to non-hydrodynamic seals. It can be appreciated, that rotary seal 42 may, if desired, have a non-circular hydrodynamic edge facing first fluid 4, and may also have a non-circular hydrodynamic edge facing second fluid 5.

Because rotary seal 42 and rotary seal 44 are exposed to a differential pressure which is a only fraction of pressure P1, the severity of seal contact pressure against shaft 8 is significantly reduced compared to the prior art, thereby significantly reducing the severity of seal and shaft wear compared to the prior art, and providing a laterally translatable sealing assembly which is capable of sealing much higher pressures than the prior art.

The reduction of severity of seal contact pressure against the shaft provided by the pressure staging also ensures that the seal contact pressure is in a range which is compatible with the use of hydrodynamic seals, which further extend rotary seal and shaft life, and provides the assembly with the capability to handle even higher pressures, by lubricating the dynamic sealing interface. Contact pressure at the seal to shaft interface is an important factor relating to hydrodynamic performance of a hydrodynamic seal because it directly influences film thickness, however the extremely high service pressures desired in some applications can create seal contact pressure which is incompatible with satisfactory performance of hydrodynamic seals unless the staging and fluid circulation system taught by the present invention is employed.

When a condition of elevated lubricant pressure exists across a resilient rotary seal, the hydrostatic force resulting from the lubricant pressure acting over the hydraulic area of the rotary seal drives the rotary seal against the opposite gland wall. At some level of elevated lubricant pressure, the portion of the rotary seal adjacent to the extrusion gap between the shaft and the seal carrier begins to locally bulge or protrude in to the extrusion gap. This phenomenon is commonly called "extrusion" by the seal industry. The magnitude of extrusion is directly dependent upon several factors, including the size of the extrusion gap, the lubricant pressure, and the modulus of the seal material, which decreases with temperature. In high pressure sealing applications, extrusion can lead to severe fatigue damage known as "nibbling" or "extrusion damage", which causes seal material loss and thereby significantly reduces the operational life of the seal. Extrusion damage is caused by cyclic stressing of the seal material which protrudes into the extrusion gap, which ultimately causes the protruding material to fatigue and break away from the rotary seal. Continuing material loss from extrusion related fatigue damage can ultimately lead to rotary seal failure. In the present invention, extrusion damage is minimized by permitting the seal carrier to translate laterally in unison with the shaft in response to dynamic runout of the shaft so that runout induced variations in the size of the extrusion gap are minimized.

When hydrodynamic rotary seals are employed in the present invention, the added extrusion resistance provided by the lateral translation of the seal carrier, and by the cooling effect of the circulation, provides means which improve long term hydrodynamic lubrication by counteracting several film degradation actions, as follows. The propagation of extrusion damage across the peripheral dynamic sealing surface (206 on FIG. 2) physically disrupts the hydrodynamic lubricant film. The resulting frictional heat further disrupts the film by reducing lubricant viscosity and by promoting heat embrittlement and film disruptive cracking of the peripheral sealing surface, and further reduces extrusion resistance by lowering the overall modulus of elasticity of the seal. Because of the improved extrusion resistance of the present invention, extrusion damage propagation and embrittlement induced crack propagation across the peripheral sealing surface is minimized, providing for adequate film thickness to be maintained so that running temperature is moderated, which also moderates temperature related modulus of elasticity loss. The added extrusion resistance of the assembly therefore provides means for controlling and maintaining the thickness of the film of lubricant in the dynamic sealing interface between the peripheral dynamic sealing surface (206 on FIG. 2) and the shaft. The loss of material due to extrusion damage can also cause the non-circular hydrodynamic geometry (208 on FIG. 2) to become distorted as pressure driven extrusion feeds portions of the dynamic lip through the extrusion gap. This volume-loss distortion effect, if severe, can negatively affect the film thickness and cause the seal to run hotter. The improved extrusion resistance of the present invention minimizes extrusion related distortion of the hydrodynamic geometry, therefore the film thickness is better maintained, permitting the seal to run cooler over the long term. When extrusion damage is sustained, the high frequency of compression, flexing and tearing of the extruded material also generates substantial heat which negatively affects film thickness and modulus of elasticity; the improved extrusion resistance of the present invention minimizes this effect. In addition to softening the seal material and making it more prone to extrusion damage, elevated temperature causes thermal expansion of the seal material which can cause excess flattening of the hydrodynamic geometry; the cooling means provided by the invention minimizes such flattening and therefore the hydrodynamic action is better maintained. The invention therefore provides means for controlling and maintaining hydrodynamic wedging of the film of lubricant and controlling and maintaining the thickness of the film of lubricant between the peripheral sealing surface and the relatively rotatable surfaces of the shaft by virtue of minimizing extrusion damage, minimizing distortion of the hydrodynamic geometry, minimizing heat generation, and maximizing cooling. The circulation of first fluid 4 and second fluid 5 for cooling purposes minimizes elevated temperature related loss of viscosity of first fluid 4 and second fluid 5, which is also important to optimum hydrodynamic lubrication. If first fluid 4 and second fluid 5 were not circulated, the viscosity thereof would be significantly less, and therefore the thickness of the hydrodynamic film of hydrodynamic rotary seals would therefore be less.

Additionally, in the present invention, the initial compression of the resilient rotary seals does not have to accommodate the dynamic runout of the shaft 8, therefore less initial compression can be used compared to non-translating prior art, resulting in less initial seal to shaft interfacial contact pressure, making the assembly more suitable for use with hydrodynamic seals. The minimal radial motion occurring between seal carriers 26 and 30 and the shaft 8 also helps to minimize the wear which can be caused when abrasives become entrapped between the closely fitted extrusion gaps of the relatively rotating parts and then crushed by radial motion.

Although a specific radial bearing arrangement has been discussed to position the seal carriers 26 and 30 in substantially concentric orientation with the shaft 8, such is not intended to be in any way limiting of the scope of this invention. Bearing means other than the journal bearing means shown may be incorporated in conjunction with the present invention of FIG. 1 and FIGS. 2–13 without departing from the spirit or scope thereof. For example, needle roller bearings, cylindrical roller bearings, ball bearings, angular contact bearings, plastic journal bearings, or tapered roller bearings may be substituted for the closely fitting journal bearing-type relationship between the journal bearing bores of the seal carriers and the mating surfaces of shaft 8. For another example, journal bearing bore 68 and journal bearing bore 70 may be lined with a bearing material such as bearing bronze and other copper based bearing materials including copper-lead, leaded bronze and tin bronze, or such as babbitt, cadmium-based alloys, silver, sintered metal including silver infiltrated porous metal, or such as plastic, or reinforced plastic.

The sliding seals 46 and 50 and sliding barrier seals 96 and 102 may conveniently take any suitable form, such as O-Rings. It should be noted, however, that other types of flexible seals, such as square rings, spring or O-Ring energized plastic or reinforced-plastic vee-rings such as Teflon vee-rings, or Chevron seals can also be used without departing from the spirit or scope of this invention so long as the effective sealing diameter thereof is exploited in the manner taught herein. When sliding seals 46 and 50 and sliding barrier seals 96 and 102 take the form of O-Rings, square-rings, PolyPak-type seals, or other types of interference seals, it is preferred that they be constructed of a low friction material, such as an elastomer having a low-friction additive and/or surface treatment. An example of such a material would be Parker compound N4274A85.

Aside from staging, rotary seals 42 and 44 provide a degree of redundancy. In the event that either rotary seal 42 or 44 fails, the failure can be detected by the pressure change of second fluid 5, but first fluid 4 is still retained by the remaining operational seal, and the machine can continue to operate while the corrective maintenance activity is being planned and scheduled. This feature alone can result in the savings of tens of thousands of dollars in some applications, such as offshore drilling rigs, because it permits the maintenance activity to be postponed until some other piece of equipment requires the rig to be shut down for maintenance.

Although a specific number of stages are shown and discussed in regard to FIG. 1, such is not intended to limit the scope of the invention, which can use any number of stages if desired.

The invention permits a number of features, heretofore believed to be mutually exclusive, to co-exist in a compact arrangement and to function in a co-operative manner to provide for sealing pressures in large diameter equipment which are substantially beyond the capacity of the prior art; to wit:

1. Laterally translatable seal carriers of axially hydraulic force balanced configuration which move laterally in response to shaft motion, which make extremely close shaft to seal carrier clearances possible to enhance extrusion resistance, while at the same time preventing heavily loaded rubbing contact between the shaft and seal carrier which could otherwise damage the rotary seal, 2. Fluid circulation near the rotary seals and through the seal carrier journal bearings for efficient cooling thereof for improved rotary seal extrusion resistance, and for prevention of thermal binding at the journal bearings, 3. Seal carriers which are substantially immune to differential pressure-induced diameter changes, thereby permitting small rotary seal extrusion gaps which enhance rotary seal extrusion resistance, 4. An assembly which can be installed at either or both ends of a solid, unsleeved shaft which incorporates an integral bearing thrust shoulder while the shaft and the one or more bearings remain installed in the housing, 5. Pressure staging which divides the fluid pressure across two or more rotary seals for enhanced extrusion resistance, higher pressure capability, and better compatibility with rotary seal hydrodynamic lubrication, and 6. Pressure staging which divides the fluid pressure across two or more of the sliding seals required by laterally translating seal carriers, thereby resulting in less extrusion damage to the sliding seals.

The result of this combination of features provides the invention with the ability to seal a very high fluid pressure, well beyond the capacity of the prior art, at one or both ends of a large diameter relatively rotatable shaft which penetrates a pressure housing or vessel.

The Alternative Embodiment of FIG. 3

FIG. 3 illustrates that the seal housing 12 can be made integral with the housing 2 if desired without departing from the spirit or scope of the invention. FIG. 3 also illustrates that the outboard rotary seal 122 which establishes a low pressure sealed relationship between retainer 18 and surface 124 of shaft 8 to define a sealed annular cavity or cooling chamber 126 can be an interference type hydrodynamic seal of the type described previously in conjunction with FIG. 2 without departing from the spirit or scope of the invention.

FIG. 3 also illustrates that anti-rotation member 114 can be radially oriented, and can react seal and bearing torque to a pocket 116 in the bulkhead 24 without departing from the spirit or scope of the invention. FIG. 3 also shows that the retaining means 20 retaining retainer 18 to seal housing 12 can take the form of threaded engagement between retaining retainer 18 and seal housing 12 without departing from the spirit or scope of the invention.

FIG. 3 also shows that a seal 21 between seal housing 12 and retainer 18 eliminates the need for seals 22 and 23 which were shown in FIG. 1, and provides for bulkhead 24 to be radially pressure balanced along it's entire axial length, and therefore entirely free of pressure-induced expansion, which is an advantage over the embodiment shown in FIG. 1.

FIG. 3 also shows that undercuts 152, 154, 156, and/or 158 may be employed if desired; alternately undercuts could be placed on the mating surfaces.

FIG. 3 also shows that one or more communication holes 161 may be used to perform the same pressure drop control function as the flow slots 108 and 112 in FIG. 1.

FIG. 3 also shows that the sliding seals such as sliding seal 50 may take the form of a V-shaped seal without departing from the spirit or scope of the present invention, provided the effective sealing diameter is understood and properly implemented to provide substantially hydraulic force balancing in the axial direction.

FIG. 3 also shows that the sliding seals such as sliding seal 46 may take the form of a multiple modulus seal having a first section 164 of high modulus at the sliding interface, and having a second section 166 of lower modulus for energizing the first section, without departing from the spirit or scope of the present invention. Such a sliding seal has the important advantages of low interfacial contact pressure and low breakout and sliding friction, combined with high extrusion resistance. An angulated flank 168 provides hydrodynamic wedging of lubricant into the sealing interface in response to lateral motion of the seal carrier, and an abrupt circular flank 170 provides an exclusionary function.

Figure 4:
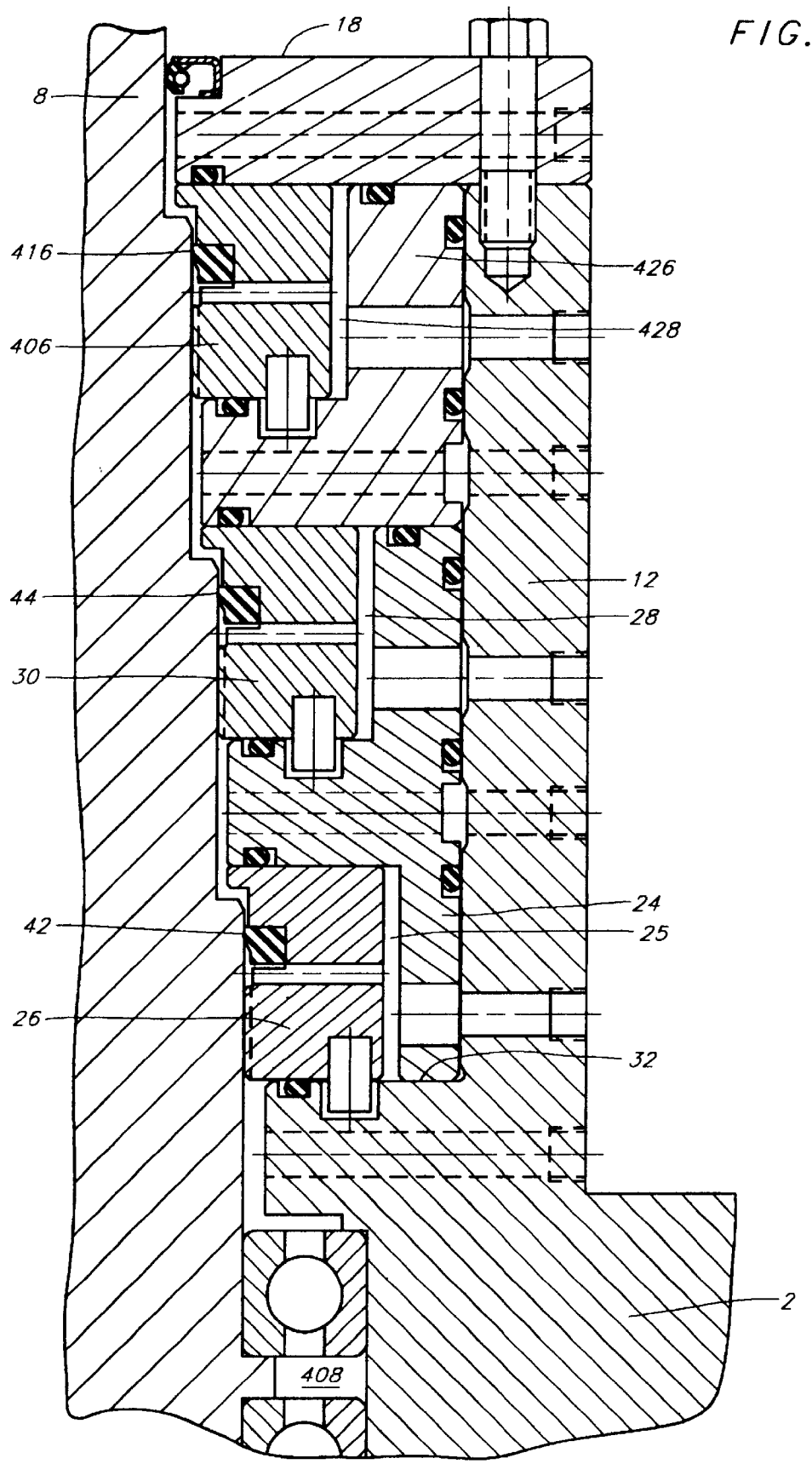
FIG. 4 is another quarter sectional view illustrating a further alternative embodiment of the present invention having a axially hydraulic force balanced laterally translatable seal carrier means embodying the principles of the present invention and incorporating a plurality of pressure stages, in this case, three pressure stages for three seal carriers, each having a circular rotary shaft sealing element.

The Alternative Embodiment of FIG. 4

The invention is not limited to the two stages shown in FIGS. 1 & 3. As shown in the fragmentary cross-section of FIG. 4, the invention can be configured to provide more than two hydraulic force balanced, laterally translatable seal carriers so that the fluid pressure can be divided among more than two rotary seals and more than two sliding seals. FIG. 4 also shows that the bulkhead means may be comprised of a plurality of bulkheads 24 and 426. In FIG. 4, a first stage seal carrier 26, a second stage seal carrier 30, and a third stage seal carrier 406 are provided so that the pressure of first fluid 408 within the housing 2 is divided among rotary seals 42, 44 and 416 so that each of the rotary seals 42, 44 and 416 are exposed to a differential pressure which is only a fraction of the pressure of the lubricant 408 within housing 2. Each of the rotary seals 42, 44, and 416 have dynamic rotary sealing engagement with relatively rotatable shaft 8 whenever relative rotation occurs between relatively rotatable shaft 8 and housing 2.

Retainer 18 clamps bulkhead 24 against interior surface 32 of housing 2, and retains the bulkheads and seal carriers within seal housing 12. Interior surface 32 may be substantially planar, as shown. Bulkhead 24 defines a first seal carrier recess 25 within which is located the first stage seal carrier 26, and defines a second seal carrier recess 28 within which is located the second stage seal carrier 30. First stage seal carrier 26 and second stage seal carrier 30 are deposed in laterally translatable assembly relative to bulkhead 24 and housing portions 2 and 12. Bulkhead 426 defines a third seal carrier recess 428 within which is located third stage seal carrier 406 which is deposed in laterally translatable assembly relative to bulkhead 426 and housing portions 12 and 2. First stage seal carrier 26, a second stage seal carrier 30, and a third stage seal carrier 406 are substantially hydraulic force balanced in the axial direction, and therefore substantially free of axially oriented hydraulic force, and free to translate laterally, in the manner described above in conjunction with FIG. 1.

Rotary seals 42, 44, and 416 are annular resilient sealing elements which are installed in grooves in their respective seal carriers. The grooves are sized to hold the seals in radial compression against the outside of shaft 8 which initiates a sealing relationship between the rotary seals and their respective grooves and mating surfaces of shaft 8. Rotary seals 42, 44, and 416 may conveniently take the form of hydrodynamic seals such as those patented and sold by Kalsi Engineering, Inc. under the registered trademark "Kalsi Seals", or they may take the form of any one of a number of other rotary shaft seals which are suitable for the purposes intended.

Figure 5:
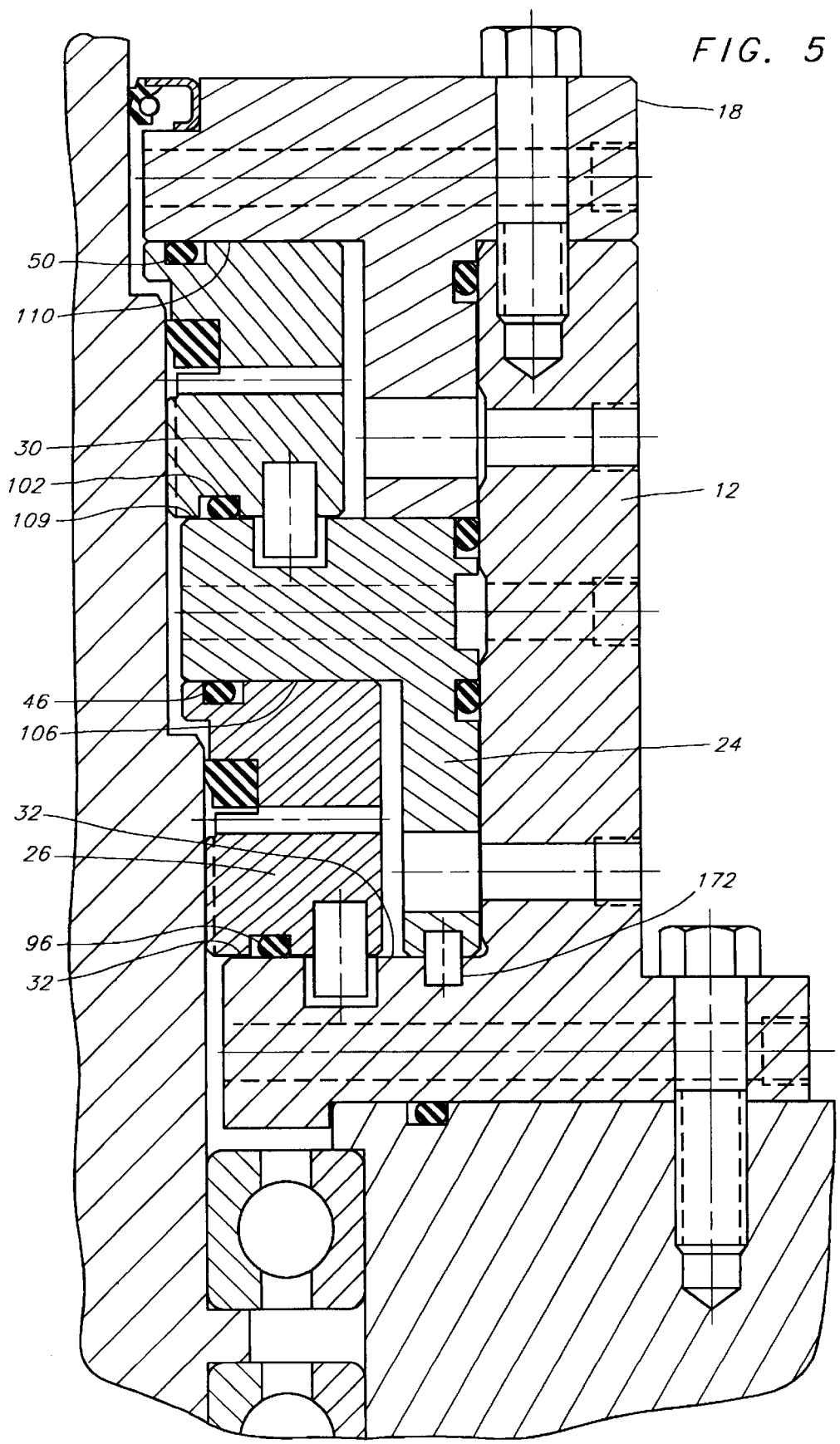
FIG. 5 is another quarter sectional view illustrating another alternative embodiment of the present invention having an axially hydraulic force balanced laterally translatable seal carrier embodying the principles of the present invention and differing from the embodiment of FIG. 1 in the location of the sliding seals.

The Alternative Embodiment of FIG. 5

In the fragmentary cross-section of FIG. 5, Sliding barrier seal 96 is located in a seal groove cut into first stage seal carrier 26, and has sliding engagement with interior surface 32 of seal housing 12, and Sliding barrier seal 102 is located in a seal groove cut into second stage seal carrier 30, and has sliding engagement with surface 109 of bulkhead 24.

Sliding seal 46 is located in a seal groove cut into first stage seal carrier 26, and has sliding engagement with interior surface 106 of bulkhead 24, and sliding seal 50 is located in a seal groove cut into second stage seal carrier 30, and has sliding engagement with interior surface 110 of retainer 18.

Bulkhead 24 may prevented from rotating by virtue of being clamped against interior surface 32 by retainer 18, or by other suitable means, such as by a mechanical indexing member 172 providing indexing and anti-rotational engagement between bulkhead 24 and housing 12. Alternately, the Indexing and anti-rotational engagement could be between bulkhead 24 and retainer 18.

FIG. 5 also shows retainer 18 may extend into seal housing 12, and shows that bulkhead 24 may be L-shaped as well as the T-shape shown in FIG. 1.

In other respects, the embodiment of FIG. 5 is substantially identical to the embodiment of FIG. 1.

Figure 6:
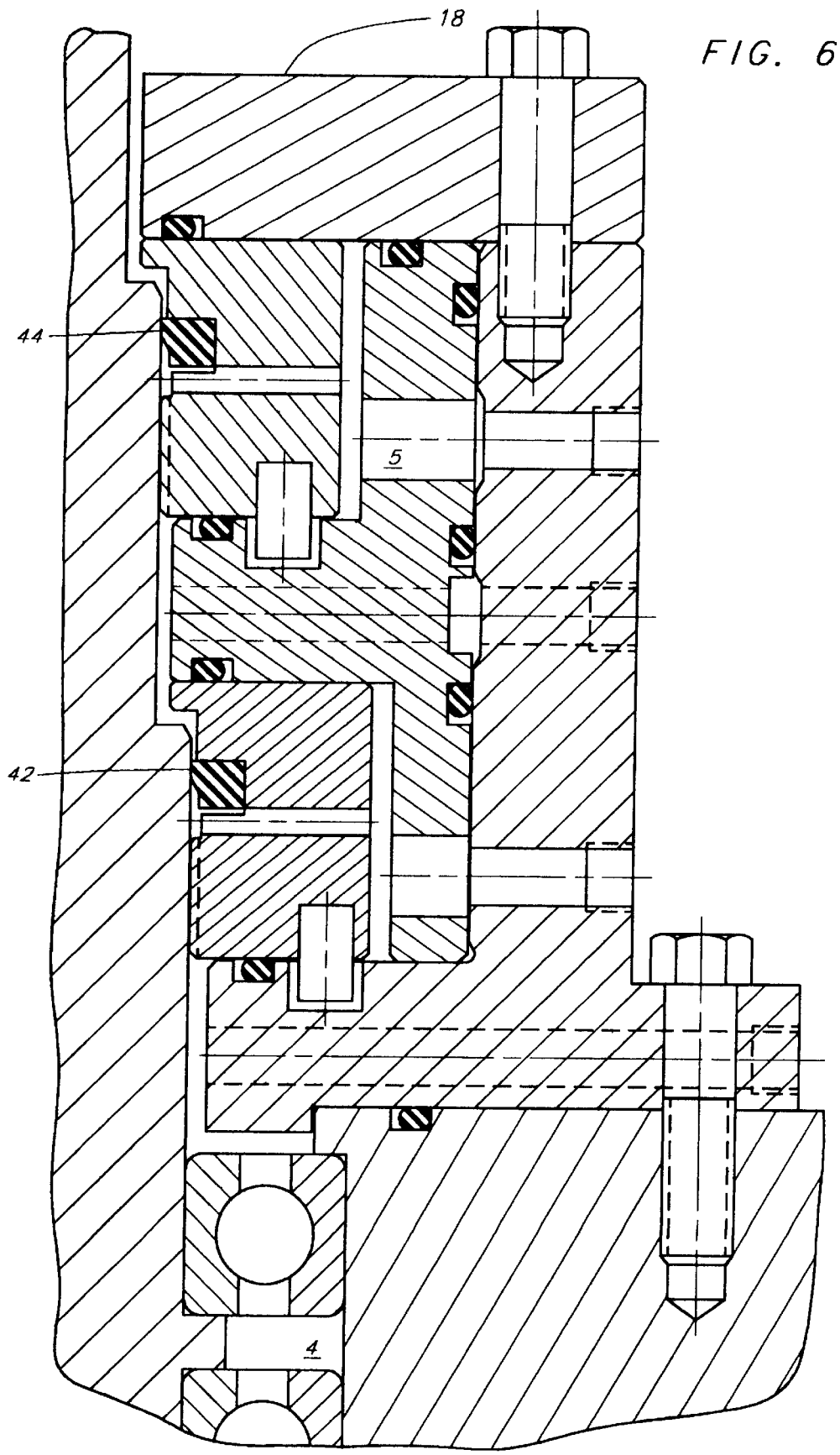
FIG. 6 is a quarter sectional view illustrating a further alternative embodiment of the present invention having axially hydraulic force balanced laterally translatable seal carrier means embodying the principles of the present invention and differs from the preferred embodiment of FIG. 1 in the location of the pressure distribution and cooling passages thereof.

The Alternative Embodiment of FIG. 6

In the fragmentary cross-section of FIG. 6, a shaft sealing mechanism is illustrated which is structurally identical in all respects to that of FIG. 1 with the exception that, for the sake of simplicity, the low pressure rotary seal 122 and passage 128 of FIG. 1 have been eliminated from the retainer 18 of FIG. 6. In the embodiment of FIG. 1, a fluid coolant was circulated within annular cavity 126, and through a heat exchanger. The simplification of FIG. 6 eliminates the fluid coolant circulation within annular cavity 126 described previously in conjunction with FIG. 1.

In the embodiment of FIG. 6, circulating first fluid 4 and second fluid 5 provide a thermal sink for rotary seal 42 of the first stage, but rotary seal 44 of the last stage is less well cooled because circulating fluid is absent on the environment side of rotary seal 44.

Therefore, if the pressure of first fluid 4 is divided evenly between rotary seals 42 and 44 of FIG. 6, rotary seal 44 will run hotter than rotary seal 42, and will suffer significantly more heat and extrusion damage than rotary seal 42, and in most cases will fail before rotary seal 42. In the simplified embodiment of FIG. 6, it is therefore preferred to divide the pressure of fluid 4 unequally between rotary seals 42 and 44 commensurate with their respective thermal sinks such that the differential pressure acting across rotary seal 44 is less than the differential pressure acting over rotary seal 42 so that the operating temperature and the service life of the seals are more equal. In summary, the use of reduced differential pressure across the rotary seal of the last stage, compared to other stages and regardless of the number of stages, improves the life of the shaft sealing mechanism by reducing the service conditions of the rotary seal of the last stage, which has a significantly worse heat transfer environment compared to the rotary seal(s) of any other stage.

Figure 7:
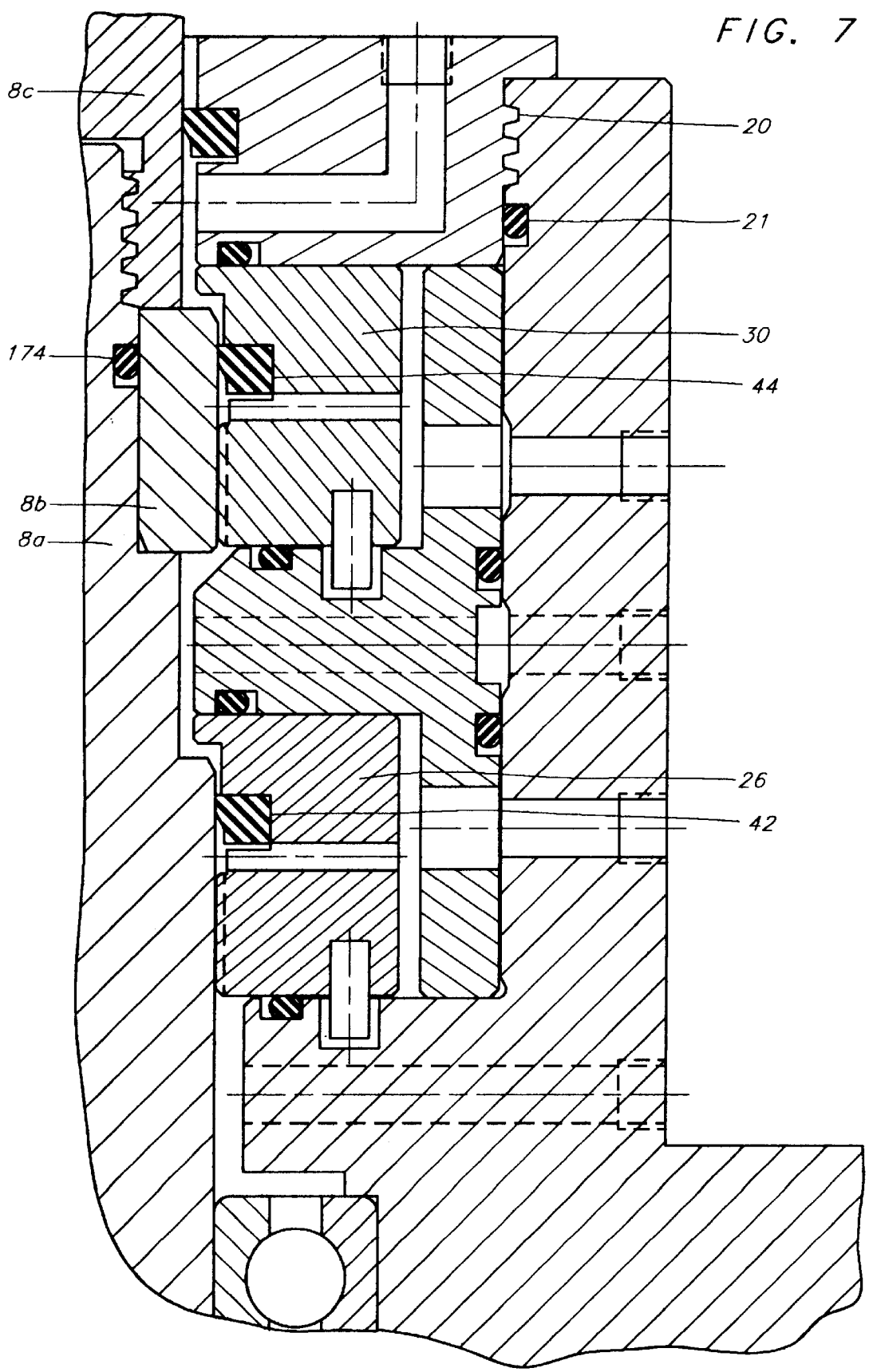
FIG. 7 is a quarter sectional view illustrating a further alternative embodiment of the present invention and showing axially hydraulic force balanced laterally translatable seal carrier means constructed in accordance with the present invention and being in sealing assembly with a rotary shaft having a shaft component or connection providing an enlarged shaft sealing section for sealing engagement by the shaft seal of a seal carrier.
Figure 8:
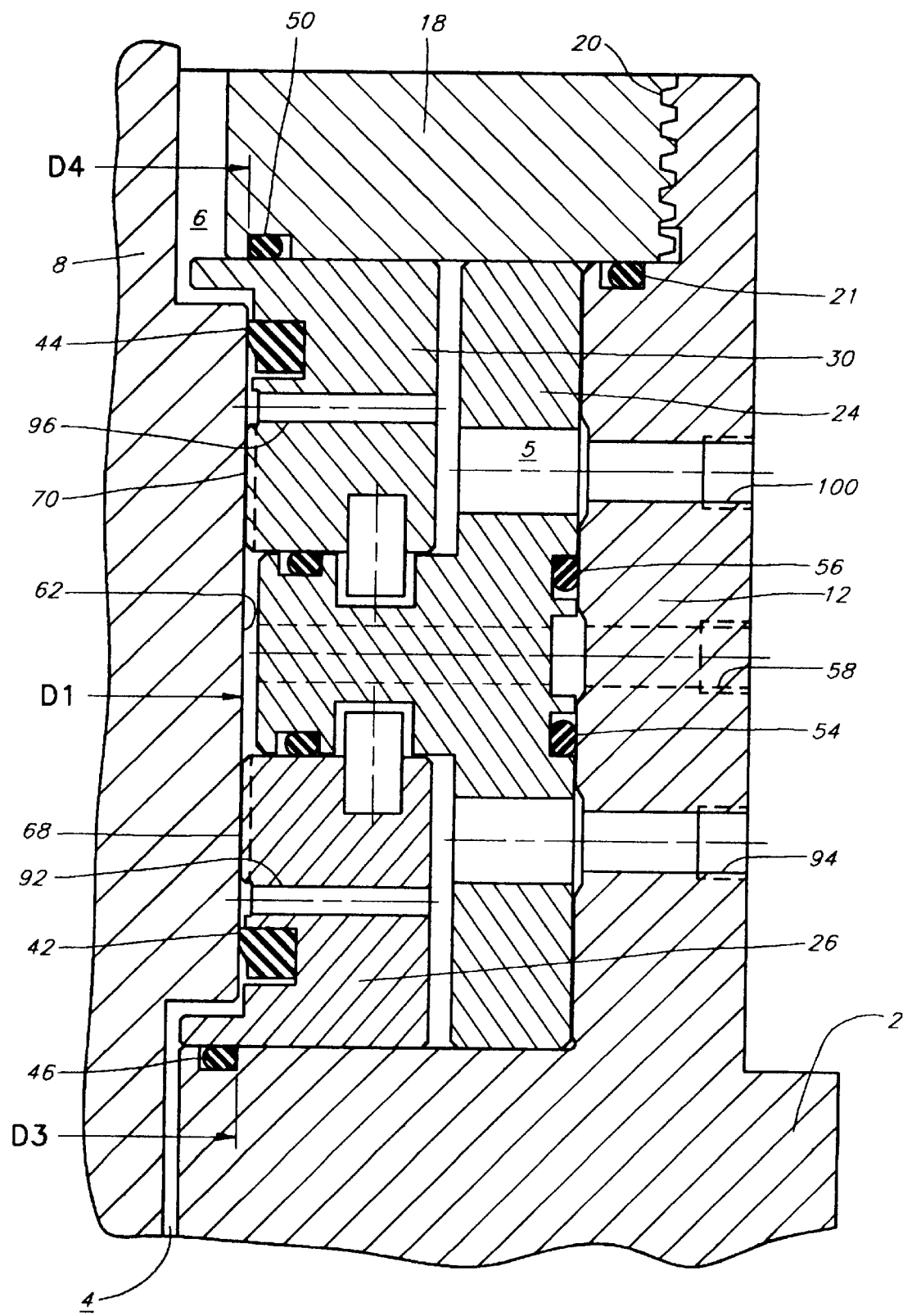
FIG. 8 is another quarter sectional view illustrating another alternative embodiment of the present invention having axially hydraulic force balanced laterally translatable seal carrier means constructed in accordance with the present invention and arranged for sealing with a shaft enlargement and minimizing stepping diameters of the rotary shaft.

The Alternative Embodiment of FIG. 7

The alternative embodiment represented in fragmentary longitudinal cross-section in FIG. 7 resembles that of FIG. 3, however the shaft is composed of several parts; shaft component 8a, shaft component 8b and shaft component 8c. This multiple part shaft configuration permits first stage seal carrier 26 and second stage seal carrier 30 to be substantially identical to one another, and minimizes the amount of shaft diameter reduction needed to accommodate the second stage.

Shaft component 8b, which is a wear sleeve, telescopes onto shaft component 8a, and is retained in position by shaft component 8c, which is threadedly retained to shaft component 8a. Shaft component 8b is pressure balanced in the radial direction by virtue of the axial placement of wear sleeve seal 174. It can be appreciated that the multiple component shaft construction of FIG. 7 may be used for any desired number of pressure stages by incorporating additional wear sleeves constructed generally in accordance with shaft component 8b, and more respective wear sleeve seals deployed in the same manner as wear sleeve seal 174 in respect to the additional wear sleeves. It can also be appreciated that in an arrangement such as shown in FIG. 7, shaft component 8b and shaft component 8c may be constructed as a single component without departing from the spirit or scope of the invention. It can also be appreciated that the annular resilient rotary sealing elements 42 and 44 may establish substantially equal sealing diameters with the respective components of the rotary shaft.

As with the bulkhead of FIG. 3, the bulkhead 24 of FIG. 7 is perfectly pressure balanced in the radial direction by virtue of the axial placement of the various non-rotary seals.

The Alternative Embodiment of FIG. 8

The alternative embodiment represented in fragmentary longitudinal cross-section in FIG. 8 is a rearrangement of the geometry of the previous figures which has the advantage of not requiring the shaft to be sequentially stepped down in diameter to accommodate the first and second stage seal carriers; rather the shaft is locally stepped up.

A housing 2 of a machine partitions first fluid 4 from an environment 6. Housing 2 is penetrated by a shaft 8 which is relatively rotatable with respect to housing 2. A seal housing 12 portion of housing 2 encloses bulkhead 24.

A retainer 18 is retained by retaining means 20 and retains first stage seal carrier 26, bulkhead 24, and second stage seal carrier 30. Seal 21 establishes a static sealed relationship between seal housing 12 and retainer 18. First stage seal carrier 26 and second stage seal carrier 30 are deposed in laterally translatable assembly relative to bulkhead 24 and housing portions 2 and 12. Seal 54 and seal 56 establish a static sealing relationship between bulkhead 24 and seal housing 12. Rotary seal 42 and rotary seal 44 are installed in their respective seal carriers and each establishes a rotatable sealed relationship between surface 62 of shaft 8 at effective sealing diameter D1.

Sliding seal 46 establishes a laterally slidable sealed relationship between housing 2 and first stage seal carrier 26 at effective sealing diameter D3, and sliding seal 50 establishes a laterally slidable sealed relationship between retainer 18 and second stage seal carrier 30 at effective sealing diameter D4. Effective sealing diameters D3 and D4 are substantially the same as effective sealing diameter D1, so that first stage seal carrier 26 and second stage seal carrier 30 are substantially hydraulic force balanced in the axial direction, and therefore substantially free of axially oriented hydraulic force, and free to translate laterally.

First fluid 4 is pressurized at pressure P1. A second fluid 5 is pressurized at pressure P2 which is a fraction of pressure P1. Because pressure P2 is a fraction of pressure P1, rotary seal 42, rotary seal 44, sliding seal 46 and sliding seal 50 are exposed to a differential pressure which is a only fraction of pressure P1.

It can of course be appreciated that the present invention, in any of its various embodiments, may also obviously be adapted for use in applications wherein the environment 6 is at a higher pressure than first fluid 4 by properly establishing the sealing diameters for substantially hydraulic force balancing in the axial direction, and by reversing the staging, such that pressure P2 is a fraction of the pressure of the environment.

In applications where the pressure of the environment 6 may temporarily be higher than that of fluid 4, radial passages 92 and 96 should, as shown in FIG. 8, avoid breaking directly into the glands of the rotary seals 42 and 44.

Journal bearing bore 68 and 70 establish a closely fitting journal bearing-type relationship with surface 62 of shaft 8 which forces first stage seal carrier 26 and second stage seal carrier 30 to translate laterally in response to dynamic runout and lateral offset of shaft 8.

For cooling of rotary seals 42 and 44, second fluid 5 can be circulated through passage 58, passing through the journal bearing clearance between journal bearing bores 68 and 70 and surface 62 of shaft 8, then through the radial passages in the seal carriers and bulkhead, exiting at passage 94 and 100.

Figure 9:
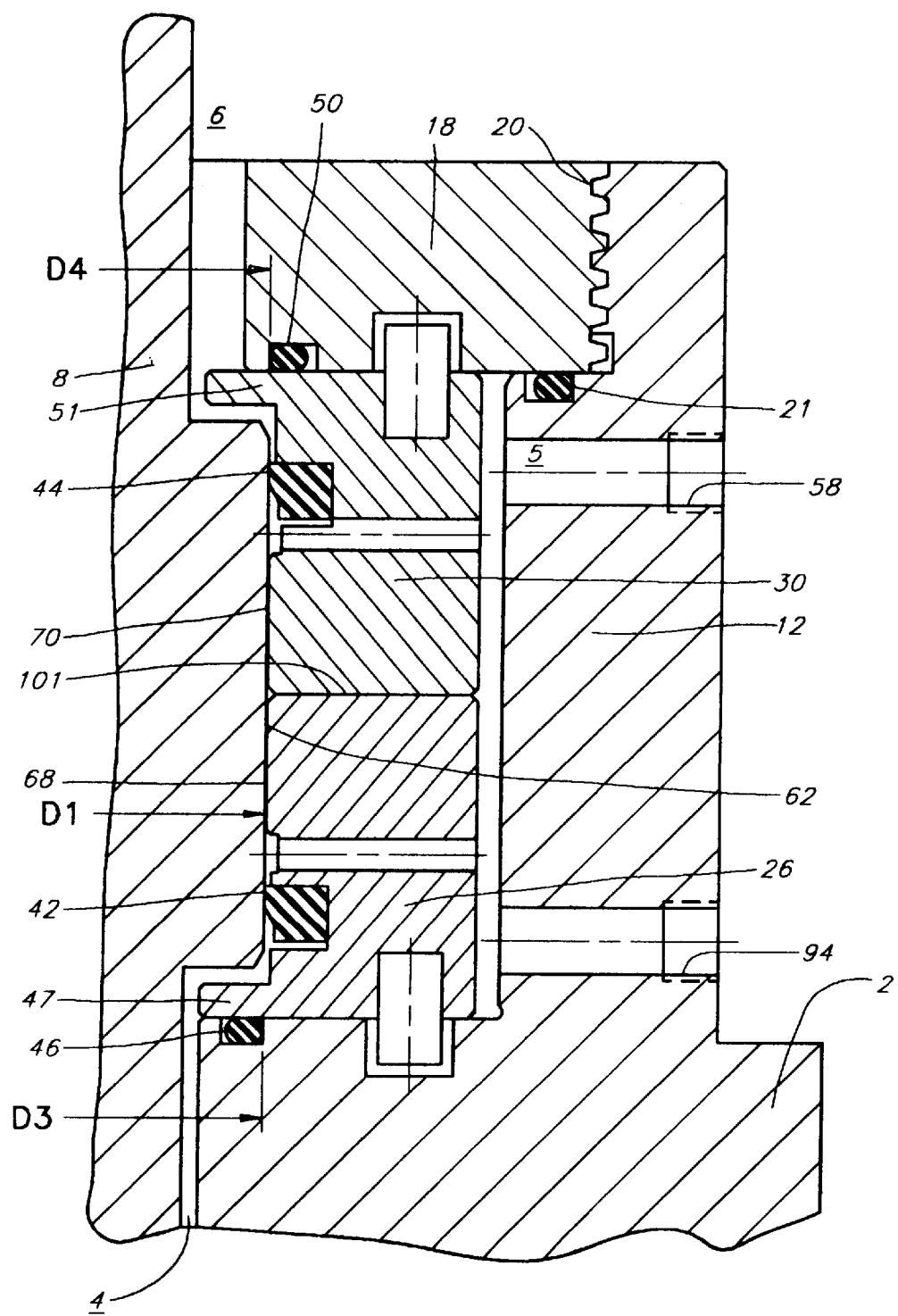
FIG. 9 is a quarter sectional view illustrating a further alternative embodiment of the present invention and showing axially hydraulic force balanced laterally translatable seal carrier means constructed in accordance with the present invention and representing a simplification of the sealing arrangement of FIG. 8.

The Alternative Embodiment of FIG. 9

The alternative embodiment represented in fragmentary longitudinal cross-section in FIG. 9 is a simplification of the embodiment of FIG. 9, the bulkhead of FIG. 8 being omitted in the embodiment of FIG. 9. A housing 2 of a machine partitions first fluid 4 from an environment 6. Housing 2 is penetrated by a shaft 8 which is relatively rotatable with respect to housing 2. A seal housing 12 portion of housing 2 encloses first stage seal carrier 26 and second stage seal carrier 30.

A retainer 18 is retained by retaining means 20 and retains first stage seal carrier 26 and second stage seal carrier 30. Seal 21 establishes a static sealed relationship between seal housing 12 and retainer 18. First stage seal carrier 26 and second stage seal carrier 30 are deposed in laterally translatable assembly relative to housing portions 2 and 12. Rotary seal 42 and rotary seal 44 are installed in their respective seal carriers and each establishes a rotatable sealed relationship with surface 62 of shaft 8 at effective sealing diameter D1.

Sliding seal 46 establishes a laterally slidable sealed relationship between housing 2 and first stage seal carrier 26 at effective sealing diameter D3, and sliding seal 50 establishes a laterally slidable sealed relationship between retainer 18 and second stage seal carrier 30 at effective sealing diameter D4. Effective sealing diameters D3 and D4 are substantially the same as effective sealing diameter D1, so that first stage seal carrier 26 and second stage seal carrier 30 are substantially hydraulic force balanced in the axial direction, and therefore substantially free of axially oriented hydraulic force, and free to translate laterally.

First fluid 4 is pressurized at pressure P1. A second fluid 5 is pressurized at pressure P2, which is a fraction of pressure P1, via passage 58. Because pressure P2 is a fraction of pressure P1, rotary seal 42, rotary seal 44, sliding seal 46 and sliding seal 50 are exposed to a differential pressure which is a only fraction of pressure P1.

Journal bearing bore 68 and 70 establish a closely fitting journal bearing-type relationship with surface 62 of shaft 8 which forces first stage seal carrier 26 and second stage seal carrier 30 to translate laterally in response to dynamic runout and lateral offset of shaft 8. If desired first stage seal carrier 26 and second stage seal carrier 30 can be connected to one another at interface 101 by any suitable means, and interface 101 may be located anywhere between inwardly projecting balancing shoulders 47 and 51; however if located between rotary seal 42 and inwardly projecting balancing shoulder 47, or between rotary seal 44 and inwardly projecting balancing shoulders 51, interface 101 must be sealed, such as with a face-sealing O-Ring.

For cooling of rotary seals 42 and 44, second fluid 5 can be circulated through passage 58, exiting at passage 94.

Figure 10:
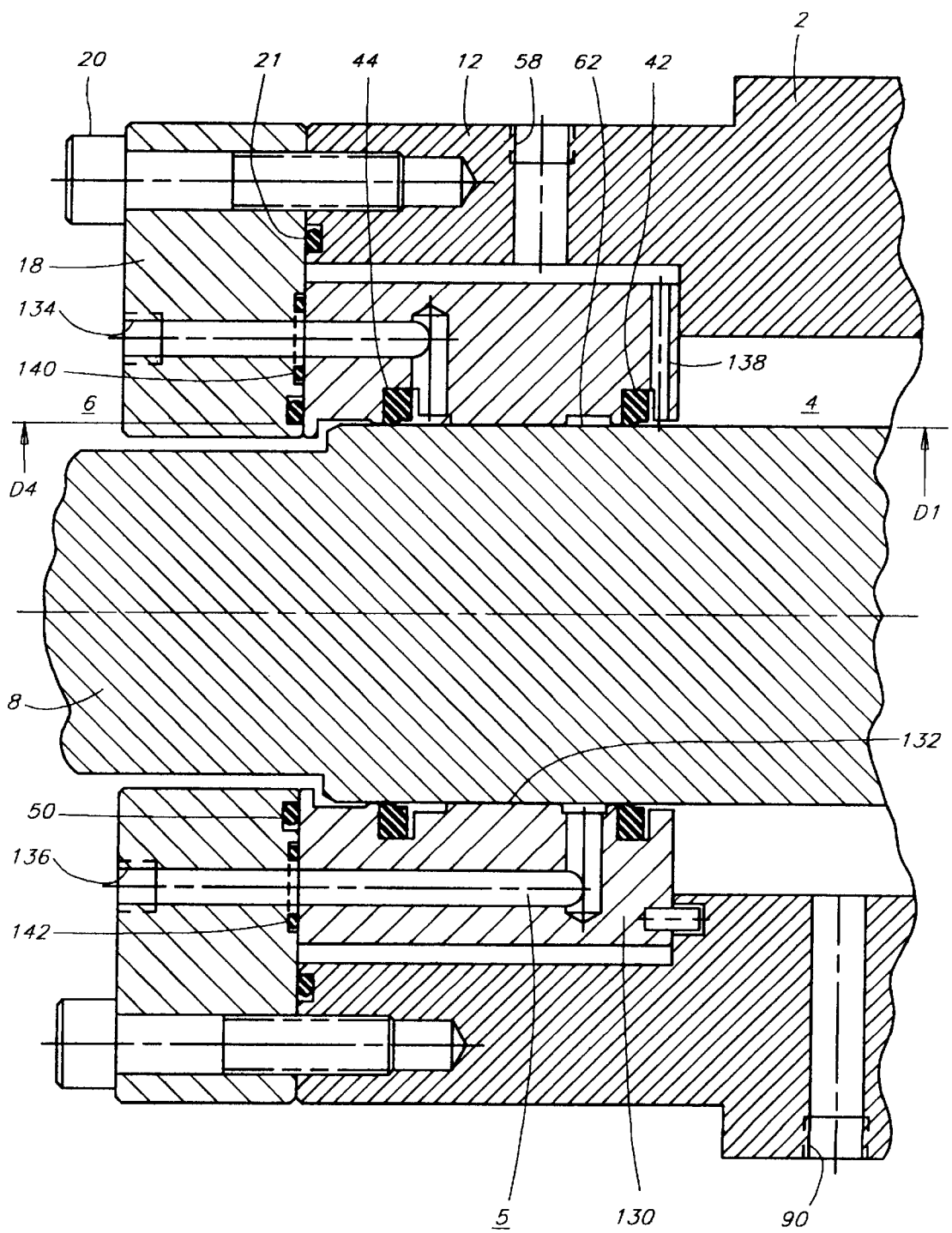
FIG. 10 is a sectional view illustrating a further alternative embodiment of the present invention and showing axially hydraulic force balanced laterally translatable seal carrier means constructed in accordance with the present invention having a pair of axially spaced pressure staged annular resilient rotary sealing elements both being carried within circular seal grooves of a single seal carrier.

The Alternative Embodiment of FIG. 10

The alternative embodiment represented in fragmentary longitudinal cross-section in FIG. 10 is a simplification of the present invention wherein rotary seal 42 and rotary seal 44 are housed in the same seal carrier, rather than in separate seal carriers.

A housing 2 of a machine partitions first fluid 4 from an environment 6. Housing 2 is penetrated by a shaft 8 which is relatively rotatable with respect to housing 2. A seal housing 12 portion of housing 2 encloses seal carrier 130.

A retainer 18 is retained by retaining means 20 and retains seal carrier 130 within seal housing 12. Seal 21 establishes a static sealed relationship between seal housing 12 and retainer 18. Seal carrier 130 is deposed in laterally translatable assembly relative housing portions 2 and 12. Rotary seal 42 and rotary seal 44 are installed in seal carrier 130 and each establishes a rotatable sealed relationship with surface 62 of shaft 8 at effective sealing diameter D1. Sliding seal 50 establishes a laterally slidable sealed relationship between retainer 18 and seal carrier 130 at effective sealing diameter D4.

First fluid 4 is pressurized at pressure P1. A second fluid 5 is pressurized at pressure P2 which is a fraction of pressure P1. Because pressure P2 is a fraction of pressure P1, rotary seal 42 and rotary seal 44 are exposed to a differential pressure which is a only fraction of pressure P1.

Journal bearing bore 132 establishes a closely fitting journal bearing-type relationship with surface 62 of shaft 8 which forces stage seal carrier 130 to translate laterally in response to dynamic runout and lateral offset of shaft 8.

For cooling of rotary seals 42 and 44, second fluid 5 can be circulated through passage 134, passing through the journal bearing clearance between journal bearing bore 132 and surface 62 of shaft 8, then exiting at passage 136. The communication of passage 134 through the interface between retainer 18 and seal carrier 130 is sealed by local O-ring 140, and the communication of passage 136 through the interface between retainer 18 and seal carrier 130 is sealed by local O-ring 142. For cooling of rotary seal 42, first fluid 4 can be circulated through passage 90, through radial holes 138 of seal carrier 130, exiting at passage 58.

Effective sealing diameter D4 is substantially the same as effective sealing diameter D1, so that seal carrier 130 is substantially hydraulic force balanced in the axial direction, and therefore substantially free of axially oriented hydraulic force, and free to translate laterally. If desired, effective sealing diameter D4 can be adjusted to offset the slight axial hydraulic force imbalance imposed by pressure P2 acting over the sealed area of local O-Ring 140 and local O-Ring 142.

Figure 11:
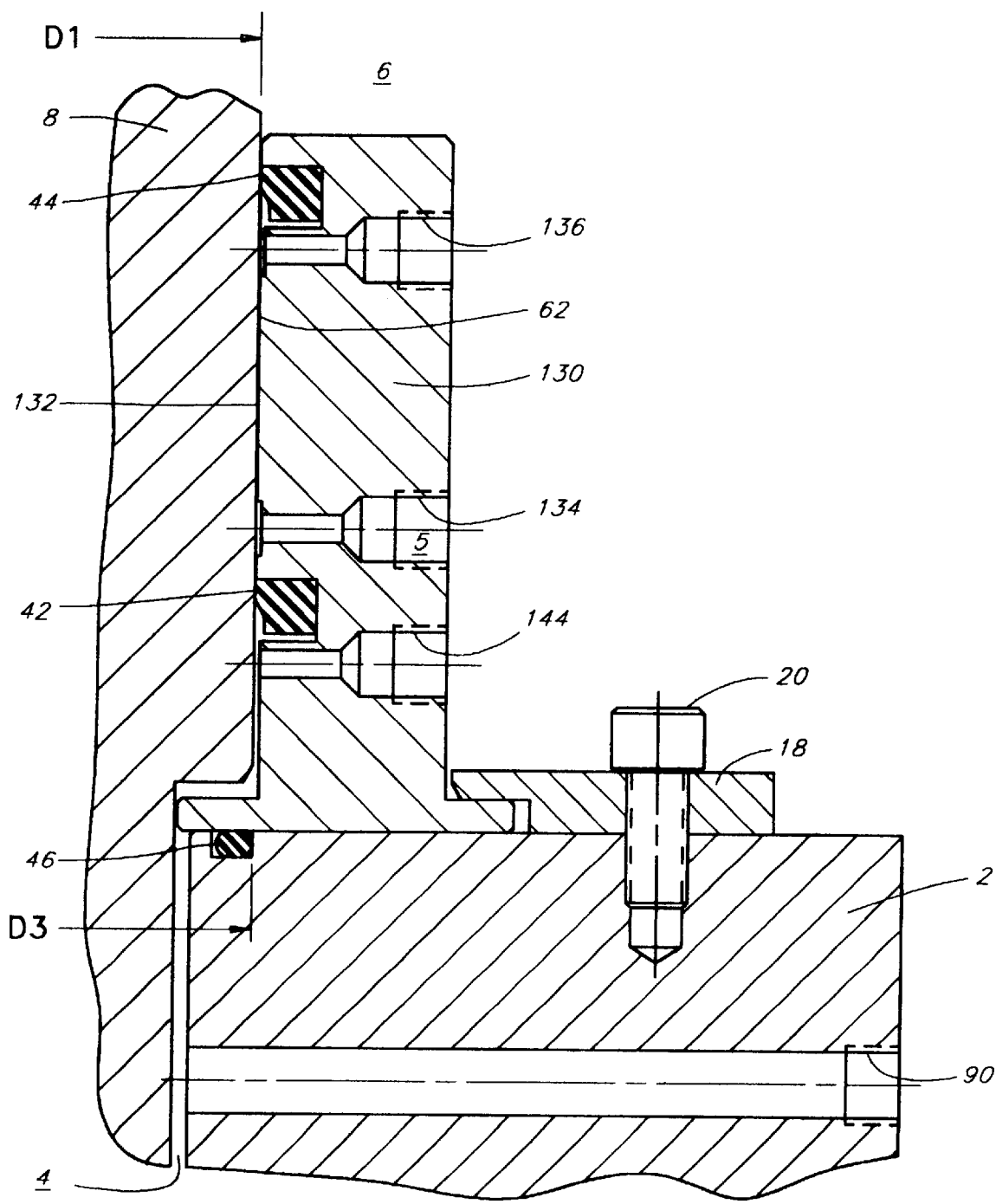
FIG. 11 is a quarter sectional view illustrating a further alternative embodiment of the present invention and showing axially hydraulic force balanced laterally translatable seal carrier means representing a simplification of the present invention showing a pair of annular resilient rotary shaft sealing elements being housed in the same seal carrier rather than in separate seal carriers.

The Alternative Embodiment of FIG. 11

The alternative embodiment represented in fragmentary longitudinal cross-section in FIG. 11 is a simplification of the present invention wherein rotary seal 42 and rotary seal 44 are housed in the same seal carrier, rather than in separate carriers.

A housing 2 of a machine partitions first fluid 4 from an environment 6. Housing 2 is penetrated by a shaft 8 which is relatively rotatable with respect to housing 2. A retainer 18 is retained by retaining means 20 and retains seal carrier 130. Seal carrier 130 is deposed in laterally translatable assembly relative to housing 2. Rotary seal 42 and rotary seal 44 are installed in seal carrier 130 and each establishes a rotatable sealed relationship surface 62 of shaft 8 at effective sealing diameter D1.

Sliding seal 46 establishes a laterally slidable sealed relationship between housing 2 and seal carrier 130 at effective sealing diameter D3. Effective sealing diameter D3 is substantially the same as effective sealing diameter D1, so that seal carrier 130 is substantially hydraulic force balanced in the axial direction, and therefore substantially free of axially oriented hydraulic force, and free to translate laterally.

First fluid 4 is pressurized at pressure P1. A second fluid 5 is pressurized at pressure P2 which is a fraction of pressure P1. Because pressure P2 is a fraction of pressure P1, rotary seal 42 and rotary seal 44 are exposed to a differential pressure which is a only fraction of pressure P1.

Journal bearing bore 132 establishes a closely fitting journal bearing-type relationship with surface 62 of shaft 8 which forces seal carrier 130 to translate laterally in response to dynamic runout and lateral offset of shaft 8.

For cooling of rotary seals 42 and 44, second fluid 5 can be circulated through passage 134, passing through the journal bearing clearance between journal bearing bore 132 and surface 62 of shaft 8, then exiting at passage 136. For cooling of rotary seal 42, first fluid 4 can be circulated through passage 90, exiting at passage 140.

It can be appreciated that, unlike the seal carriers of FIG. 1 and FIGS. 3–10, the seal carrier 130 of FIG. 11 is not pressure balanced in the radial direction, and will expand in response to pressure P1 and P2. Such expansion is an important advantage in equipment such as swivels where the shaft is hollow and contains a high pressure fluid therein, because the pressure-induced expansion of seal carrier 130 can be substantially matched to the pressure expansion of the shaft, thereby maintaining the extrusion gap and journal bearing clearance relatively constant despite the pressure expansion of the shaft and the seal carrier.

It can also be appreciated that in any of the embodiments of FIG. 1 and FIGS. 3–12, the shaft can form a dynamic sealing surface for the rotary seals which is either an external or internal substantially cylindrical shape. When the shaft forms external substantially cylindrical dynamic sealing surface(s) for the rotary seals, the laterally translatable seal carrier(s) surround the cylindrical dynamic sealing surface (s) as described, and when the shaft forms internal substantially cylindrical dynamic sealing surface(s) for the rotary seals, the laterally translatable seal carrier(s)s fit within the internal substantially cylindrical dynamic sealing surface(s) of the shaft. Thus the invention can be adapted for mechanisms in which either the internal or the external member is the rotating member; all that is required is that one of the members be non-rotating so that the required fluid communication can occur for pressure staging.

Figure 12:
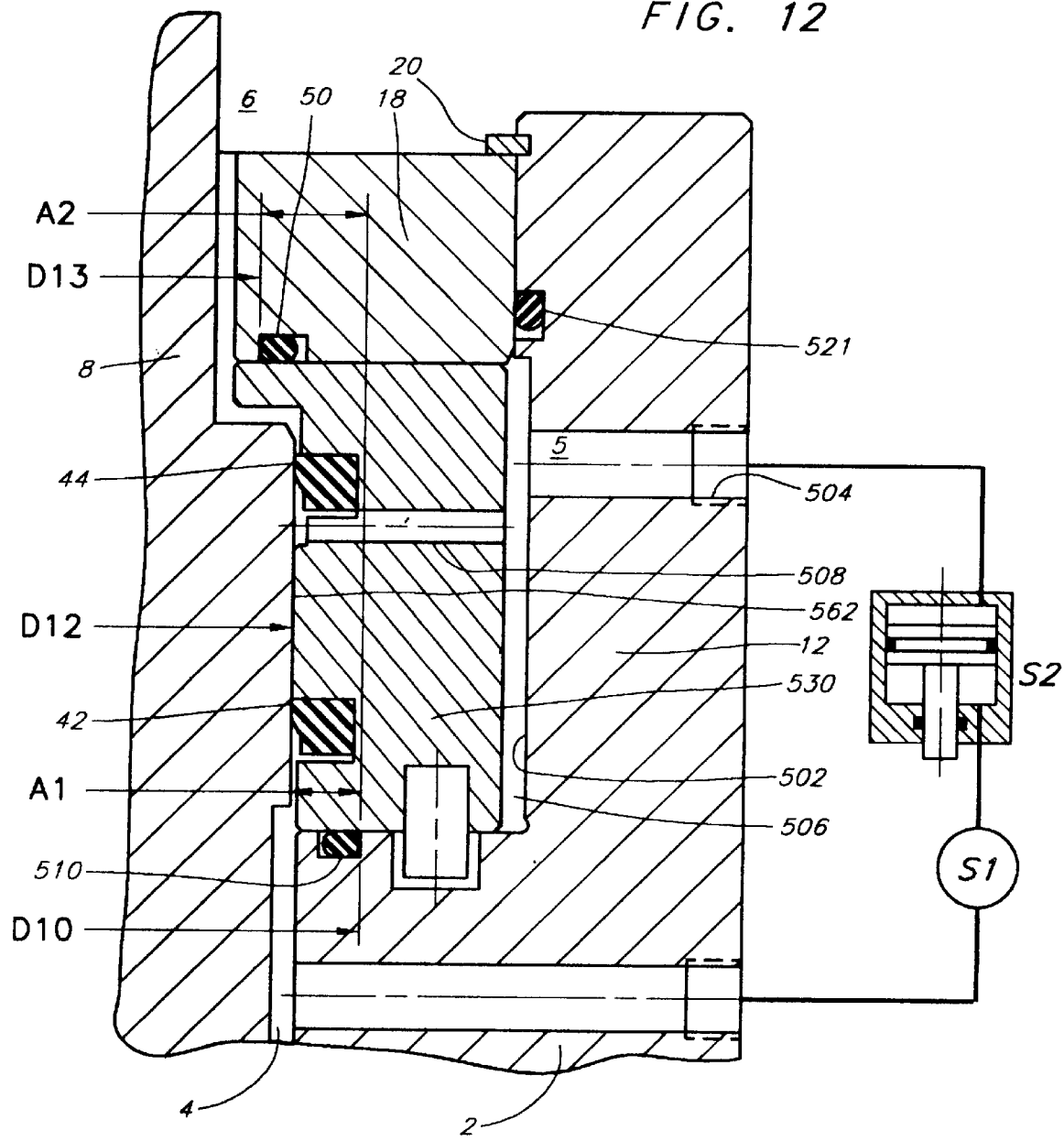
FIG. 12 is quarter sectional view illustrating a further alternative embodiment of the present invention wherein a pair of annular resilient rotary shaft sealing elements are housed in a single seal carrier.
Figure 13:
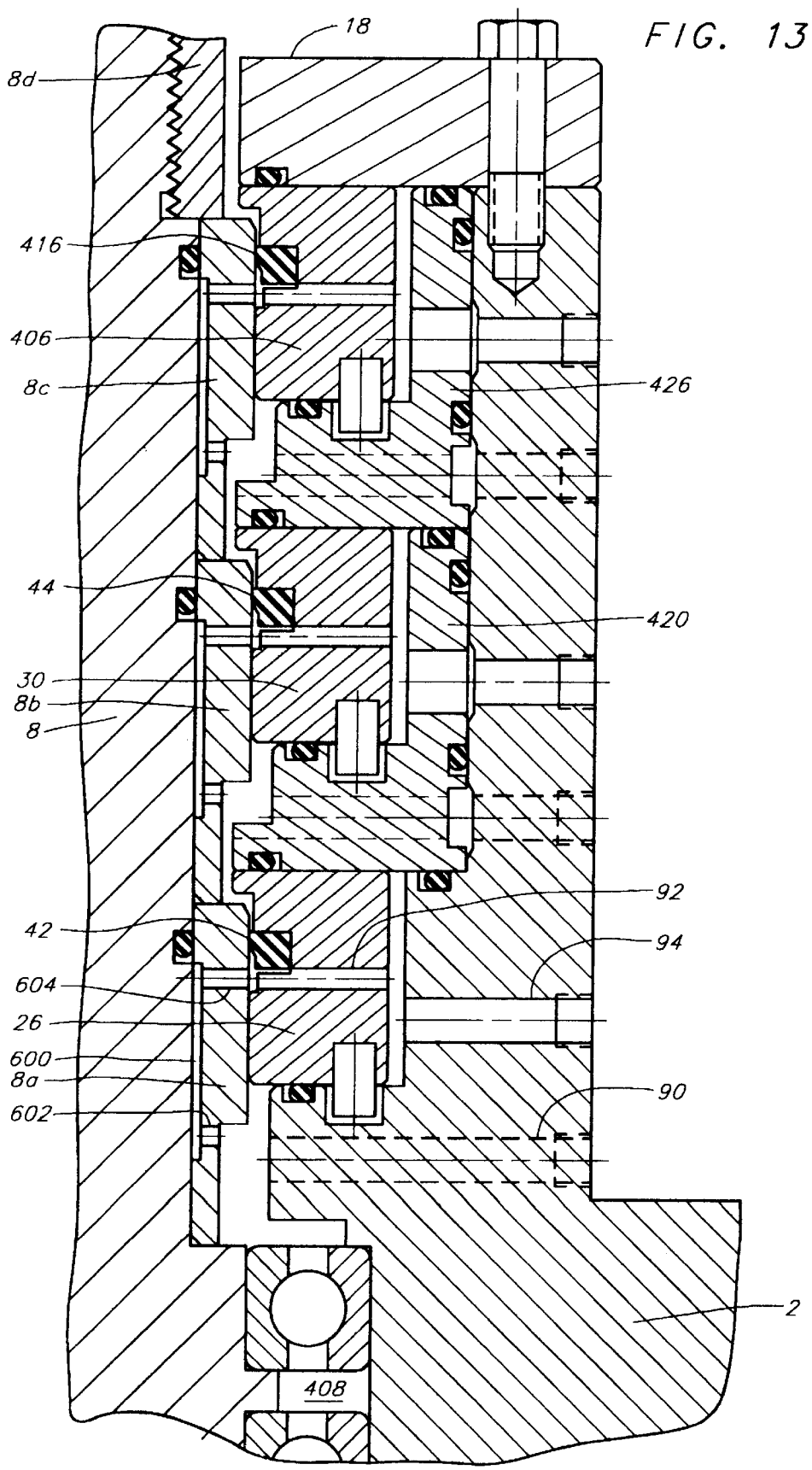
FIG. 13 is another quarter sectional view illustrating a further alternative embodiment of the present invention having a axially hydraulic force balanced laterally translatable seal carrier means embodying the principles of the present invention and incorporating a plurality of laterally translatable seal carriers and pressure stages, in this case, three pressure stages for three identical seal carriers.

The Alternative Embodiment of FIG. 12

The alternative embodiment represented in fragmentary longitudinal cross-section in FIG. 12 is a simplification of the present invention wherein rotary seal 42 and rotary seal 44 are housed in the same seal carrier, rather than in separate carriers.

A housing 2 of a machine partitions first fluid 4 from an environment 6. Housing 2 is penetrated by a shaft 8 which is relatively rotatable with respect to housing 2. A retainer 18 is retained by retaining means 20 and retains seal carrier 530. Seal carrier 530 is deposed in laterally translatable assembly relative to housing 2 within annular seal recess 502. Rotary seal 42 and rotary seal 44 are installed in seal carrier 530 and each establishes a rotatable sealed relationship surface 562 of shaft 8 at effective sealing diameter D12. Conduit 504 communicates fluid at pressure P2 to the annular region 506, and conduit 508 communicates pressure P2 to the sealed region between rotary seal 42 and rotary seal 44, Sliding seal 50 establishes a laterally slidable sealed relationship between housing 2 and seal carrier 530 at effective sealing diameter D13, which is smaller than effective sealing diameter D12. Sliding seal 510 establishes a laterally slidable sealed relationship between housing 2 and seal carrier 530 at effective sealing diameter D10, which is larger than effective sealing diameter D12. Hydraulic area A1 is defined between effective sealing diameters D10 and D12; Pressure P1 acts upon area A1 exerting a force acting toward retainer 18. Hydraulic area A2 is defined between effective sealing diameters D10 and D13; Pressure P2 acts upon area A2 exerting a force acting away from retainer 18. By sizing the ratio of A2/A1 to be substantially the same as P2/P1, the seal carrier is substantially force balanced in the axial direction, which provides the benefits previously discussed. Because a significant length of seal carrier 530 is exposed both on the interior and exterior to pressure P2, seal carrier 530 is substantially force balanced in the radial direction. If desired, the second fluid at pressure P2 may be circulated for cooling purposes.

FIG. 12 shows that pressure source S2 may if desired simply be the area ratio provided by a hydraulic cylinder.

The Alternative Embodiment of FIG. 13

As shown in the fragmentary cross-section of FIG. 13, the invention can be configured to provide more than two hydraulic force balanced, laterally translatable seal carriers so that the fluid pressure can be divided among more than two rotary seals and more than two sliding seals, while at the same time the sealing diameter of each rotary seal is substantially the same.

In FIG. 13, identical first stage seal carrier 26, second stage seal carrier 30, and third stage seal carrier 406 are provided so that the pressure of first fluid 408 within the housing 2 is divided among rotary seals 42, 44 and 416 so that each of the rotary seals 42, 44 and 416 are exposed to a differential pressure which is only a fraction of the pressure of the lubricant 408 within housing 2.

Bulkhead 420 and bulkhead 426 may be identical, as shown.

The shaft is composed of several parts; shaft component 8, shaft component 8a, shaft component 8b, shaft component 8c and shaft component 8d. This multiple part shaft configuration permits seal carriers 26, 30 and 406 to be identical to one another.

Substantially identical shaft components 8a, 8b and 8c, which are wear sleeves, telescope onto shaft component 8, and are retained in position by shaft component 8d, which is threadedly retained to shaft component 8, or retained by some other suitable method such as a retaining ring. It can be appreciated that the general construction of FIG. 13 may be used for any desired number of pressure stages.

Substantially identical shaft components 8a, 8b and 8c may each have an under-sleeve recess 600, and one or more recess inlets 602 and one or more recess outlets 604 for cooling purposes. For example, if first fluid 408 is pumped in at passage 90, the closely fitting journal bearing relationship between seal carrier 26 and shaft component 8a will restrict the flow of first fluid 408, diverting much of it through recess inlets 602, under-sleeve recess 600, and recess outlets 604, then through radial passages 92, then exiting at passage 94. Such use of an under-sleeve recess is an excellent way to minimize pressure drop of the flowing fluid through the journal bearing. For efficient heat transfer, the material of construction for shaft components 8a, 8b and 8c may be tungsten carbide.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A laterally translatable pressure staged rotary sealing mechanism comprising:
   (a) a housing having a portion thereof exposed to a first fluid at a pressure P1;
   (b) a relatively rotatable member being located for relative rotation with respect to said housing;
   (c) laterally translatable annular seal carrier means having laterally translatable movement relative to said housing responsive to lateral movement of said relatively rotatable member;
   (d) first and second rotary sealing elements being supported in axially spaced relation by said laterally translatable annular seal carrier means and having pressure sealing relation with said laterally translatable annular seal carrier means and said relatively rotatable member and defining a staging pressure chamber between said first and second rotary sealing elements;
   (e) a staging fluid supply communicating a second fluid at a staging pressure P2 to said staging pressure chamber, said staging pressure P2 being less than said pressure P1; and
   (f) a sliding seal maintaining sliding sealing engagement with said laterally translatable annular seal carrier means.

2. The laterally translatable pressure staged sealing mechanism of claim 1, comprising:
   (a) said laterally translatable annular seal carrier means being first and second seal carriers respectively supporting said first and second rotary sealing elements; and (b) at least one of said first and second seal carriers being substantially hydraulically force balanced in the axial direction so as to permit lateral translation of at least one of said first and second seal carriers regardless of the magnitude of pressures P1 and P2.

3. The laterally translatable pressure staged sealing mechanism of claim 2, comprising:
   (a) a bulkhead being located in sealed relation to said housing and defining axially spaced annular seal carrier recesses; and
   (b) said first and second seal carriers being located within said axially spaced annular seal carrier recesses.

4. The laterally translatable pressure staged sealing mechanism of claim 3, comprising:
   said bulkhead being substantially hydraulically force balanced in the radial direction.

5. The laterally translatable pressure staged sealing mechanism of clam 1, comprising:
   said first and second rotary sealing elements establishing substantially equal sealing diameters with said relatively rotatable member.

6. The laterally translatable pressure staged sealing mechanism of claim 1, comprising:
   said first and second rotary sealing elements establishing unequal sealing diameters with said relatively rotatable member.

7. The laterally translatable pressure staged sealing mechanism of claim 1, comprising:
   (a) a first fluid circulation passage for circulating said first fluid at said pressure P1 for cooling of said first rotary sealing element;
   (b) a second fluid circulation passage for circulating said second fluid at said pressure P2 within said staging pressure chamber for cooling of said first and second rotary sealing elements; and
   (c) means circulating said first and second fluids within respective first and second fluid circulation passages.

8. The laterally translatable pressure staged sealing mechanism of claim 1, comprising:
   (a) a source of circulating coolant fluid at a pressure lower than said pressure P2 of said second fluid;
   (b) an outboard seal establishing low pressure sealing with respect to said relatively rotatable member and defining a cooling chamber outboard of said first and second rotary sealing elements; and
   (c) a cooling path being disposed in fluid circulation communication with said cooling chamber for circulation of said coolant fluid within said cooling chamber for cooling of said relatively rotatable member and said second rotary sealing element.

9. The laterally translatable pressure staged sealing mechanism of claim 1, comprising:
   (a) a fluid circulation path being defined within said staging pressure chamber; and
   (b) a fluid circulation system circulating said second fluid through said fluid circulation path at said staging pressure P2 for cooling said first and second rotary sealing elements.

10. The laterally translatable pressure staged sealing mechanism of claim 1, comprising:
   (a) a bulkhead being disposed in sealed non-rotatable relation with respect to said housing and having a partition defining axially spaced annular seal carrier recesses;
   (b) said laterally translatable annular seal carrier means being at least two seal carriers disposed within said axially spaced annular seal carrier recesses, each of said seal carriers defining an internal annular seal groove; and
   (c) said rotary sealing elements each being seated within a respective internal annular seal groove and having interference sealing with said respective internal annular seal groove and with said relatively rotatable member.

11. The laterally translatable pressure staged sealing mechanism of claim 1, comprising:
   (a) said laterally translatable annular seal carrier means establishing a laterally sliding interface with a pressure retaining component; and
   (b) at least one of said pressure retaining component and said laterally translatable annular seal carrier means having a low friction surface treatment for minimizing friction at said laterally sliding interface.

12. The laterally translatable pressure staged sealing mechanism of claim 1, comprising:
   (a) engagement of said first and second rotary sealing elements with said relatively rotatable member defining respective first and second sealing interfaces with said relatively rotatable member; and
   (b) at least one of said first and second rotary sealing elements defining a non-circular hydrodynamic lubrication geometry wedging one of said first and second fluids into one of said respective first and second sealing interfaces responsive to rotation of said relatively rotatable member for lubrication.

13. The laterally translatable pressure staged sealing mechanism of claim 1, comprising:
   at least one journal bearing being defined by said laterally translatable annular seal carrier means and establishing a guiding relationship with said relatively rotatable member.

14. The laterally translatable pressure staged sealing mechanism of claim 13, comprising:
   (a) a said laterally translatable annular seal carrier means defining at least one opening therethrough;
   (b) fluid circulation through said at least one opening; and
   (c) said fluid circulation reducing pressure drop across said journal bearing.

15. The laterally translatable pressure staged sealing mechanism of claim 1, comprising:
   bearing means positioning said laterally translatable annular seal carrier means with respect to said relatively rotatable member.

16. The laterally translatable pressure staged sealing mechanism of claim 1, comprising:
   said laterally translatable annular seal carrier means being substantially hydraulic force balanced in the axial direction so as to permit lateral translation thereof regardless of the magnitude of pressure P1.

17. The laterally translatable pressure staged sealing mechanism of claim 1, comprising:
   said laterally translatable annular seal carrier means being a single seal carrier supporting said first and second rotary sealing elements and being substantially hydraulically force balanced in the axial direction so as to permit lateral translation of said seal carrier regardless of the magnitude of pressure P1.

18. The laterally translatable pressure staged sealing mechanism of claim 1, comprising:
   (a) said first fluid being a lubricant; and
   (b) means circulating said first fluid for cooling of said first rotary sealing element.

19. A laterally translatable pressure staged sealing mechanism comprising:
- (a) a housing having a chamber being exposed to a first fluid at a pressure P1;
- (b) a relatively rotatable member being located for rotation with respect to said housing;
- (c) laterally translatable annular seal carrier means being laterally movable relative to said housing responsive to lateral movement of said relatively rotatable member;
- (d) first and second rotary sealing elements being supported in axially spaced relation by said laterally translatable annular seal carrier means and having pressure sealing relation with said laterally translatable annular seal carrier means and with said relatively rotatable member and defining a pressure staging chamber;
- (e) a second fluid at a pressure P2 within said pressure staging chamber, said pressure P2 being less than said pressure P1;
- (g) a sliding seal maintaining sliding sealing engagement with said laterally translatable annular seal carrier means; and
- (h) said laterally translatable annular seal carrier means being substantially hydraulic force balanced in the axial direction so as to permit lateral translation thereof regardless of the magnitude of pressure P1.

20. The laterally translatable pressure staged sealing mechanism of claim 19, comprising:
- (a) a bulkhead defining axially spaced annular seal carrier recesses;
- (b) said laterally translatable annular seal carrier means being at least two seal carriers disposed respectively within said axially spaced annular seal carrier recesses; and
- (c) said bulkhead being substantially hydraulically force balanced in the radial direction to minimize pressure induced deformation thereof.

21. The laterally translatable pressure staged sealing mechanism of claim 19, comprising:
- (a) a bulkhead defining axially spaced annular seal carrier recesses; and
- (b) said laterally translatable annular seal carrier means being at least two seal carriers disposed respectively within said axially spaced annular seal carrier recesses.

22. The laterally translatable pressure staged sealing mechanism of claim 19, comprising:
said laterally translatable annular seal carrier means being substantially pressure balanced in the radial direction.

23. The laterally translatable pressure staged sealing mechanism of claim 19, comprising:
- (a) an outboard rotary seal establishing low pressure sealing with said relatively rotatable member and defining a cooling chamber outboard of said first and second rotary sealing elements;
- (b) a cooling fluid at a pressure lower than said pressure P2 of said second fluid; and
- (c) a cooling path being disposed in fluid circulation communication with said cooling chamber for circulation of said cooling fluid within said cooling chamber for cooling.

24. The laterally translatable pressure staged sealing mechanism of claim 19, comprising:
a fluid circulation system circulating said second fluid within said pressure staging chamber for cooling at least one of said first and second annular resilient sealing elements.

25. The laterally translatable pressure staged sealing mechanism of claim 19, comprising:
- (a) engagement of said first and second rotary sealing elements with said relatively rotatable member defining respective first and second sealing interfaces with said relatively rotatable member; and
- (b) at least one of said first and second rotary sealing elements defining a non-circular hydrodynamic geometry wedging one of said first and second fluids into one of said respective first and second sealing interfaces thereof responsive to rotation of said relatively rotatable member.

26. The laterally translatable pressure staged sealing mechanism of claim 19, comprising:
said laterally translatable annular seal carrier means being a single seal carrier supporting said first and second rotary sealing elements.

27. The laterally translatable pressure staged sealing mechanism of claim 19, comprising:
- (a) said first fluid being a lubricant; and
- (b) means circulating said first fluid for cooling of said first rotary sealing elements.

28. The laterally translatable pressure staged sealing mechanism of claim 19, comprising:
said pressure P2 being less than half of pressure P1.

29. A high pressure laterally translatable pressure staged sealing mechanism for sealing of a relatively rotatable member with respect to a housing and being exposed to a first fluid at a pressure P1, comprising:
- (a) a bulkhead means establishing axially spaced annular seal carrier recesses;
- (b) a plurality of seal carriers being located respectively within said axially spaced annular seal carrier recesses;
- (c) a plurality of rotary seals being supported respectively by said seal carriers for pressure retaining sealing with a relatively rotatable member;
- (d) at least one annular staging chamber being defined between adjacent rotary seals; and
- (e) at least a second fluid at a staging pressure P2 being less than said pressure P1 and being in communication with said at least one staging chamber.

30. The laterally translatable pressure staged sealing mechanism of claim 29, comprising:
- (a) said plurality of rotary seals being at least three annular resilient seals including a first rotary seal and a last rotary seal;
- (b) said first rotary seal being exposed to a first pressure; and
- (c) said last rotary seal being exposed to a last pressure which is less than said first pressure.

31. The laterally translatable pressure staged sealing mechanism of claim 29, comprising:
- (a) engagement of said first and second rotary sealing elements with said relatively rotatable member defining respective first and second sealing interfaces with said relatively rotatable member; and
- (b) at least one of said first and second rotary sealing elements defining a non-circular hydrodynamic lubrication geometry wedging one of said first and second fluids into one of said respective first and second sealing interfaces responsive to rotation of said relatively rotatable member for lubrication.

* * * * *

UNITED STATES PATENT AND TRADEMARK OFFICE
CERTIFICATE OF CORRECTION

PATENT NO. : 6,227,547 B1
DATED : May 8, 2001
INVENTOR(S) : Lannie Dietle, Jeffrey D. Gobeli It is certified that error appears in the above-identified patent and that said Letters Patent is hereby corrected as shown below:

Title page,
Item [56], "OTHER PUBLICATIONS", delete "Development of Composite Coiled Tubing"; insert -- A Novel High-Pressure Rotary Shaft Seal Facilitates Innovations in Drilling and Production Equipment --

Insert -- Kalsi, et al., "Development of a Higher Pressure Rotary Blowout Preventer for Safe Directional Drilling in the Underbalanced Application," Department of Energy document, pp 1 and 12, May 1995. --

Column 3,
Line 15, after "hereof", insert -- . --
Line 40, delete "inventions", insert -- invention --

Column 5,
Line 18, after "13", insert -- . --

Column 6,
Line 47, delete "a only", insert -- only a --

Column 7,
Line 11, delete "an other", insert -- another --

Column 10,
Line 18, delete "oriented if", insert -- oriented. If --

Column 20,
Line 65, delete "carriers(s)s", insert -- carrier(s) --

UNITED STATES PATENT AND TRADEMARK OFFICE
CERTIFICATE OF CORRECTION

PATENT NO. : 6,227,547 B1
DATED : May 8, 2001
INVENTOR(S) : Lannie Dietle, Jeffrey D. Gobeli It is certified that error appears in the above-identified patent and that said Letters Patent is hereby corrected as shown below:

Claim 5,
Line 18, delete "clam" and insert -- claim --

Claim 27,
Line 23, delete "elements" and insert -- element. --

Signed and Sealed this

Twenty-seventh Day of November, 2001

Attest:

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO.  : 6,227,547 B1
DATED       : May 8, 2001
INVENTOR(S) : Lannie Dietle et al.

Page 1 of 1

It is certified that error appears in the above-identified patent and that said Letters Patent is hereby corrected as shown below:

<u>Column 1,</u>
Line 9, after the word "herein", insert -- . Portions of this invention were made with government support under Grant DE-FG03-90ER80939 awarded by the Department of Energy. The government has certain rights in this invention. --

Signed and Sealed this

Second Day of November, 2004

JON W. DUDAS
*Director of the United States Patent and Trademark Office*